US008674004B2

(12) United States Patent
Fisher et al.

(10) Patent No.: US 8,674,004 B2
(45) Date of Patent: Mar. 18, 2014

(54) RUBBER COMPOSITION, METHOD FOR ITS FORMATION, AND AUTOMOTIVE TIRE CONTAINING THE COMPOSITION

(71) Applicants: Scott Michael Fisher, Delmar, NY (US); Qiwei Lu, Seven Hills, OH (US); William Eugene Pecak, Cohoes, NY (US); Michael Joseph O'Brien, Clifton Park, NY (US)

(72) Inventors: Scott Michael Fisher, Delmar, NY (US); Qiwei Lu, Seven Hills, OH (US); William Eugene Pecak, Cohoes, NY (US); Michael Joseph O'Brien, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 14/010,959

(22) Filed: Aug. 27, 2013

(65) Prior Publication Data

US 2014/0011926 A1 Jan. 9, 2014

Related U.S. Application Data

(62) Division of application No. 13/488,701, filed on Jun. 5, 2012, now Pat. No. 8,557,937.

(60) Provisional application No. 61/644,605, filed on May 9, 2012.

(51) Int. Cl.

| | |
|---|---|
| ***C04B 28/02*** | (2006.01) |
| ***C04B 24/26*** | (2006.01) |
| ***B60R 13/08*** | (2006.01) |
| ***C08K 5/00*** | (2006.01) |
| ***C08F 2/00*** | (2006.01) |

(52) U.S. Cl.

USPC ...... 524/6; 524/4; 524/67; 524/216; 526/209; 526/88

(58) Field of Classification Search

USPC ...................... 524/6, 4, 67, 216; 526/209, 88

See application file for complete search history.

(56) References Cited

U.S. PATENT DOCUMENTS

| | | | |
|---|---|---|---|
| 3,306,874 | A | 2/1967 | Hay |
| 3,383,340 | A | 5/1968 | MacCallum et al. |
| 3,639,508 | A | 2/1972 | Kambour |
| 3,732,174 | A | 5/1973 | Nicholas |
| 3,835,200 | A | 9/1974 | Lee, Jr. |
| 4,141,876 | A | 2/1979 | Hansen |
| 4,283,503 | A | 8/1981 | Wright |
| 4,388,444 | A | 6/1983 | Irvin |
| 4,436,870 | A | 3/1984 | Hinselmann et al. |
| 4,760,118 | A | 7/1988 | White et al. |
| 4,782,108 | A | 11/1988 | Yano et al. |
| 5,109,052 | A | 4/1992 | Kasai et al. |
| 6,291,563 | B1 | 9/2001 | Horne et al. |
| 6,291,588 | B1 | 9/2001 | Nahmias et al. |
| 6,306,978 | B1 | 10/2001 | Braat et al. |
| 6,316,592 | B1 | 11/2001 | Bates et al. |
| 6,448,327 | B1 | 9/2002 | Braat et al. |
| 6,469,101 | B2 | 10/2002 | Nahmias et al. |
| 6,646,032 | B2 | 11/2003 | Jang et al. |
| 6,646,066 | B2 | 11/2003 | Hahn et al. |
| 6,875,812 | B1 | 4/2005 | Akiyama et al. |
| 6,984,687 | B2 | 1/2006 | Henning et al. |
| 7,071,246 | B2 | 7/2006 | Xie et al. |
| 7,244,783 | B2 | 7/2007 | Lean et al. |
| 7,326,748 | B2 | 2/2008 | Ajbani et al. |
| 7,347,237 | B2 | 3/2008 | Xie et al. |
| 7,491,769 | B2 | 2/2009 | Patel et al. |
| 7,560,513 | B2 | 7/2009 | Silvi et al. |
| 7,652,162 | B2 | 1/2010 | Silvi et al. |
| 7,776,967 | B2 | 8/2010 | Perry et al. |
| 8,025,158 | B2 | 9/2011 | Delsman et al. |
| 8,084,549 | B2 | 12/2011 | Silvi et al. |
| 2005/0171267 | A1 | 8/2005 | Zanzig et al. |

FOREIGN PATENT DOCUMENTS

| | | | |
|---|---|---|---|
| EP | 0117834 | A1 | 9/1984 |
| EP | 0292153 | A2 | 11/1988 |
| EP | 0540106 | A1 | 5/1993 |
| FR | 2378814 | | 8/1978 |
| JP | 4285658 | | 10/1992 |
| JP | 5271424 | | 10/1993 |
| JP | H6179752 | | 6/1994 |
| JP | H6287367 | | 10/1994 |
| JP | 987450 | | 3/1997 |
| JP | H9143312 | | 6/1997 |
| JP | 200435725 | | 5/2000 |
| JP | 2001279026 | | 10/2001 |
| JP | 2001323107 | | 11/2001 |

(Continued)

OTHER PUBLICATIONS

International Search Report; International Application No. PCT/US2012/069336; International Filing Date Dec. 13, 2012; 6 pages.

(Continued)

*Primary Examiner* — Michael Bernshteyn

(74) *Attorney, Agent, or Firm* — Cantor Colburn LLP

(57) ABSTRACT

A rubber composition with disperse phase particles containing poly(phenylene ether) can be formed by a method that includes melt blending an uncured rubber with a poly(phenylene ether) composition containing a poly(phenylene ether) and an oil to form an uncured rubber composition, then curing the uncured rubber composition. Before being blended with the rubber, the poly(phenylene ether) composition exhibits a glass transition temperature of about 40 to about 140° C., and during blending with the rubber, the oil component of poly(phenylene ether) composition migrates from the poly(phenylene ether) composition to the rubber, leaving a poly(phenylene ether)-containing disperse phase that gives rise to a second hysteresis peak temperature of about 160 to about 220° C. as measured by dynamic mechanical analysis of the cured rubber composition. Also described are the poly (phenylene ether) composition used in the method, a cured rubber composition formed by the method, and a tire containing the cured rubber composition.

11 Claims, 5 Drawing Sheets

(56) References Cited

FOREIGN PATENT DOCUMENTS

| | | | | |
|---|---|---|---|---|
| JP | 2002212339 | | | 7/2002 |
| JP | 200491747 | | | 3/2004 |
| JP | 2004210931 | | | 7/2004 |
| KR | 10-0331377 | B1 | | 4/2002 |
| WO | 2011076802 | A1 | | 6/2011 |
| WO | WO 2011076802 | A1 | * | 6/2011 |

OTHER PUBLICATIONS

Written Opinion of the International Searching Authority; International Application No. PCT/US2012/069336; International Filing Date Dec. 13, 2012; 5 pages.

JP2002338805A; Nov. 27, 2002; Abstract Only; 1 page.

DE4030399 A1, Apr. 2, 1992, Abstract, 2 pages.

JP2002307907 A, Oct. 23, 2002 with Abstract, 1 page.

Kucera et al., "Caplus Abstract", Collection of Czechoslovak Chemical Communication, 54(1), 1989, pp. 106-116.

Servens et al., "Synthesis and characterization of poly[(2,6-dimethyl-1,4-phenylene oxide)-block-isoprene] diblock copolymers", Macromol. Chem. Phys. 198, 1997, pp. 379-389.

Wicker et al., "Copolymerization of macromonomers of poly(2,6-dimethyl-1,4-phenylene oxide) with various comonomers", Makromol. Chem. 192, 1991, pp. 1371-1385.

* cited by examiner

RUBBER COMPOSITION, METHOD FOR ITS FORMATION, AND AUTOMOTIVE TIRE CONTAINING THE COMPOSITION

CROSS REFERENCE TO RELATED APPLICATIONS

This application is a division of U.S. Nonprovisional application Ser. No. 13/488,701 filed Jun. 5, 2012, which claims the benefit of U.S. Provisional Application Ser. No. 61/644,605 filed May 9, 2012. These priority applications are hereby incorporated by reference in their entirety.

BACKGROUND OF THE INVENTION

Poly(phenylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

The reinforcement of rubber compositions with poly(phenylene ether) particles is known. For example, U.S. Pat. No. 3,383,340 to MacCallum et al. describes incorporating poly (phenylene ether) in place of carbon black or inorganic fillers in order to provide a white rubber composition that can take on any desired color. In practice, however, it is difficult to uniformly disperse the poly(phenylene ether) in the rubber composition because rubber compositions are typically blended at temperatures at which poly(phenylene ether)s remain solid. Moreover, to the extent that it is desired to prepare a rubber composition with disperse phase poly(phenylene ether) particles that are smaller than about 35 micrometers in diameter, then the process of preparing the rubber composition would require the use of similarly sized poly(phenylene ether) particles as a starting material, the handling of which in air can create a dust explosion hazard.

U.S. Pat. No. 6,469,101 to Nahmias et al. describes a rubber composition into which is incorporated an organic compound that can be, among others, an amorphous or semicrystalline polymer that is substantially insoluble in the rubber base and exhibits a first or second order transition temperature of from 80 to 160° C. Nahmias abstract. Nahmias discloses that "[o]ptimum results have been achieved with polyphenylenether having a glass transition temperature of 120° C., marketed by Huls under the trade name VESTORAN™ 1100." Nahmias, column 2, lines 42-45. VESTORAN™ 1100 is known to be a miscible blend of about 80 weight percent homopolystyrene and about 20 weight percent poly(phenylene ether). Although the low glass transition temperature of 120° C. for VESTORAN™ 1100 facilitates its blending with rubber, the homopolystyrene/poly(phenylene ether) particles in the resulting rubber would cause the rubber to exhibit an elevated tan delta value at 80 to 140° C., which is predictive of undesirably increased heat build up and increased abrasion in an automotive tire containing the rubber.

U.S. Pat. No. 6,646,066 to Hahn et al. describes rubber compositions with particles of a thermoplastic polymer "selected from at least one of polyphenylene ether, polyphenylene sulfide and syndiotactic polystyrene". Hahn, column 3, lines 61-62. In the working examples, Example 1, Sample B contains "polyphenylene ether as an alloy with polystyrene". Hahn, column 5, lines 66-67. The poly(phenylene ether) alloy with polystyrene was obtained as VESTORAN™ 1900, which is known to have a Vicat softening point of 190°

C. Given that the poly(phenylene ether) alloy was blended with the rubber at 165° C., the poly(phenylene ether) alloy remained a solid during that process and was therefore difficult to disperse in the rubber.

Thus, known methods of incorporating poly(phenylene ether) into rubber compositions either utilize a poly(phenylene ether) composition that is a solid under rubber blending conditions and therefore is inadequately dispersed in the rubber composition, or they utilize a poly(phenylene ether) composition that softens under rubber blending conditions and is therefore better dispersed but performs inadequately as a reinforcement in the resulting rubber composition due to the reduced glass transition temperature that facilitated its dispersion. There therefore remains a need for a method of incorporating poly(phenylene ether) into a rubber composition so that the poly(phenylene ether) is well dispersed in the rubber but maintains the high heat-resistance associated with improved performance as a reinforcement.

BRIEF SUMMARY OF EMBODIMENTS OF THE INVENTION

One embodiment is a method of forming a rubber composition, comprising: melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C.

Another embodiment is a method of forming a rubber composition, comprising: melt blending 100 parts by weight of a rubber comprising ethylenic unsaturation, and about 5 to about 40 parts by weight of a poly(phenylene ether) composition exhibiting a glass transition temperature of about 40 to about 140° C. and comprising a poly(phenylene ether) having a glass transition temperature of about 170 to about 220° C. and an oil selected from the group consisting of mild extraction solvate (MES) oils, treated distillate aromatic extract (TDAE) oils, residual aromatic extract (RAE) oils, and combinations thereof to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C.

Another embodiment is a cured rubber composition, comprising: a continuous phase comprising a rubber, and a disperse phase comprising a poly(phenylene ether); wherein the composition is prepared by a method comprising melt blending a rubber comprising ethylenic unsaturation, and a poly (phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form the cured rubber composition; wherein the rubber composition exhibits, by dynamic mechanical analysis, a second hysteresis peak temperature of about 160 to about 220° C.; and wherein the rubber composition exhibits a Graves tear strength value, determined according to ASTM D624-00 (2012) at 23° C., that is at least 10 percent greater than a Graves tear strength value determined for a corresponding composition prepared by a method comprising separately adding the poly(phenylene ether) and the oil to the rubber, rather than melt blending the rubber and the poly(phenylene ether) composition.

Another embodiment is a tire comprising a rubber composition described herein.

Another embodiment is a poly(phenylene ether) composition comprising: about 50 to about 95 weight percent of a poly(phenylene ether), and about 5 to about 50 weight percent of a rubber processing oil selected from the group consisting of mild extraction solvate (MES) oils, distillate aromatic extract (DAE) oils, treated distillate aromatic extract (TDAE) oils, residual aromatic extract (RAE) oils, treated residual aromatic extract (TRAE) oils, special residual aromatic extract (SRAE) oils, naphthenic oils, heavy naphthenic oils, and combinations thereof.

These and other embodiments are described in detail below.

DETAILED DESCRIPTION OF THE INVENTION

The present inventors have determined that when a rubber composition is prepared using a pre-blended mixture of poly (phenylene ether) and oil, the mixture having a glass transition temperature of about 40 to about 140° C., the poly(phenylene ether) is well dispersed in the rubber composition and recovers its high glass transition temperature as the oil migrates from the poly(phenylene ether) disperse phase to the continuous rubber phase. Compared to prior art methods in which a poly(phenylene ether) solid is blended with the rubber, the present method facilitates dispersion of the poly (phenylene ether) in the rubber, avoids the handling of fine particle poly(phenylene ether) powders that pose a dust explosion hazard, and improves the tear strength of the resulting rubber. Compared to prior art methods in which the poly (phenylene ether) is pre-blended with a polymer such as polystyrene to reduce its glass transition temperature, the present method yields a cured rubber in which the disperse phase has a higher glass transition temperature and therefore provides lower heat build up and lower abrasion in automotive tires comprising the rubber.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

One embodiment is a method of forming a rubber composition, comprising: melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C.

Figure 1:
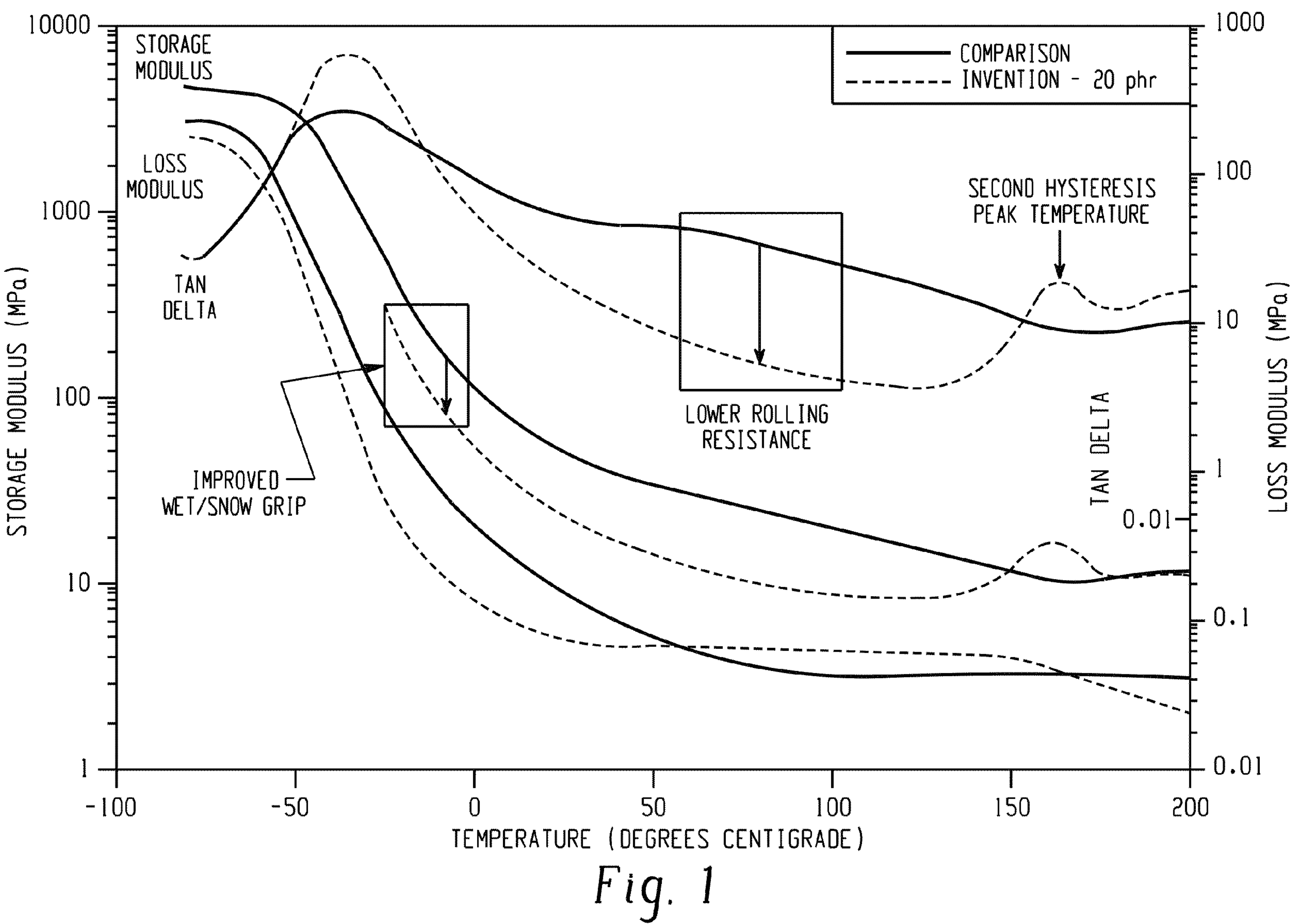
FIG. 1 is a plot of storage modulus, loss modulus, and tan delta versus temperature for two rubber compositions, one being a comparative rubber composition without an incorporated poly(phenylene ether) composition, and the other being an inventive composition with 20 parts by weight of poly (phenylene ether) composition per 100 parts by weight rubber. Relative to the comparative rubber composition, the inventive rubber composition exhibits reduced values of storage modulus in the −25 to 0° C. range that are predictive of improved tire grip on snow and ice, and reduced tan delta values in the temperature range of 55 to 105° C. that are predictive of lower tire rolling resistance. The tan delta curve for the inventive rubber composition also exhibits a second hysteresis peak temperature at about 160° C.
Figure 2:
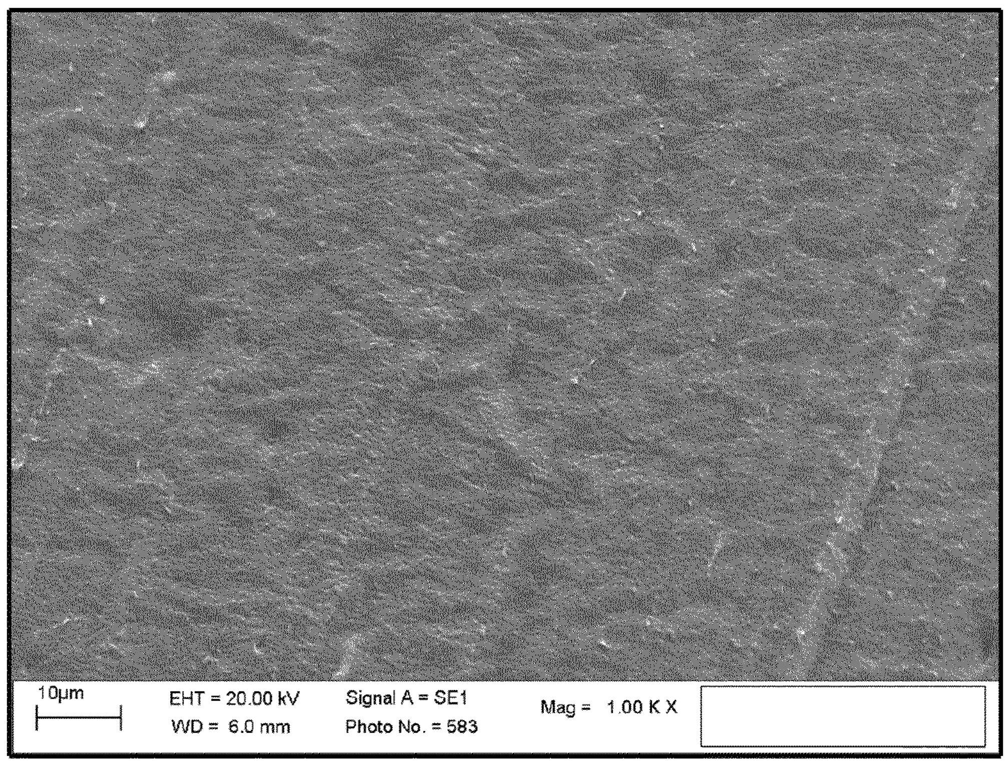
FIG. 2 is a scanning electron micrograph of a toluene-etched surface corresponding to Comparative Example 52 (rubber without any added poly(phenylene ether) composition).
Figure 3:
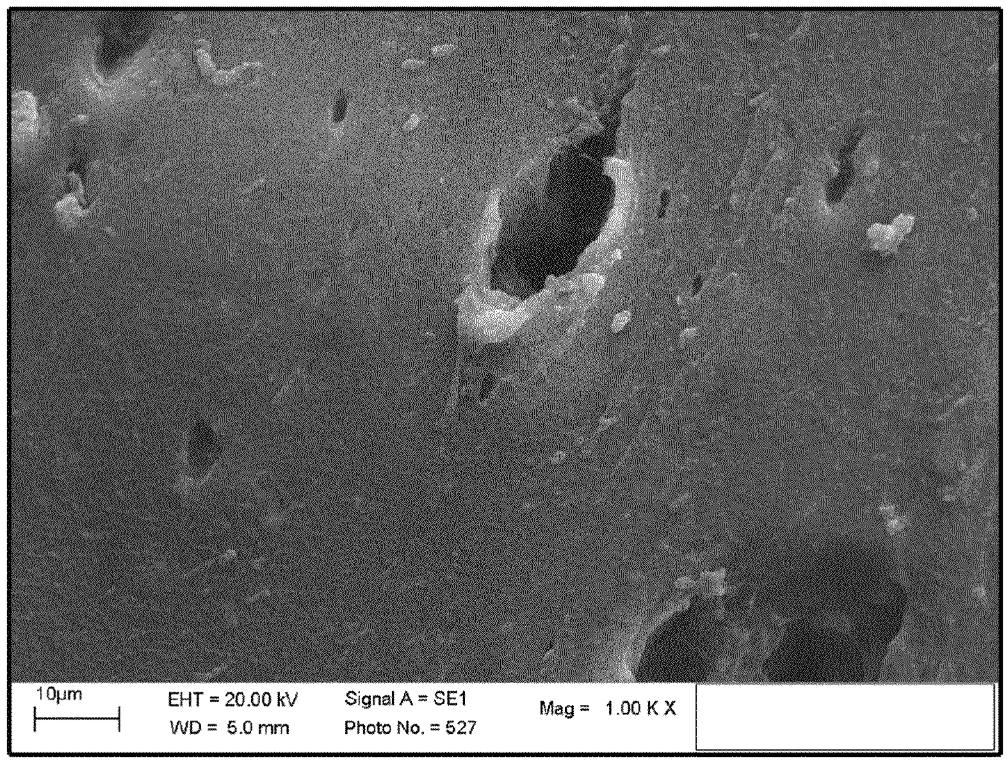
FIG. 3 is a scanning electron micrograph of a toluene-etched surface corresponding to Comparative Example 53 (rubber to which poly(phenylene ether) and oil were added separately).
Figure 4:
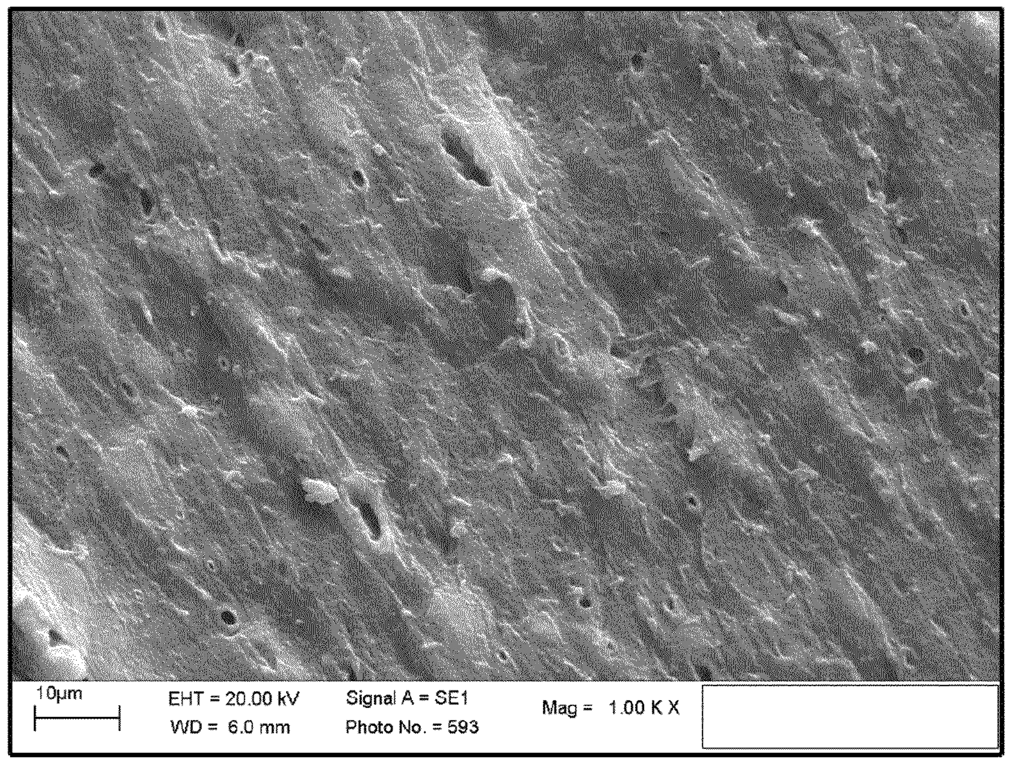
FIG. 4 is a scanning electron micrograph of a toluene-etched surface corresponding to Example 46 (rubber to which was added a poly(phenylene ether) composition containing 70 weight percent poly(phenylene ether) and 30 weight percent oil).
Figure 5:
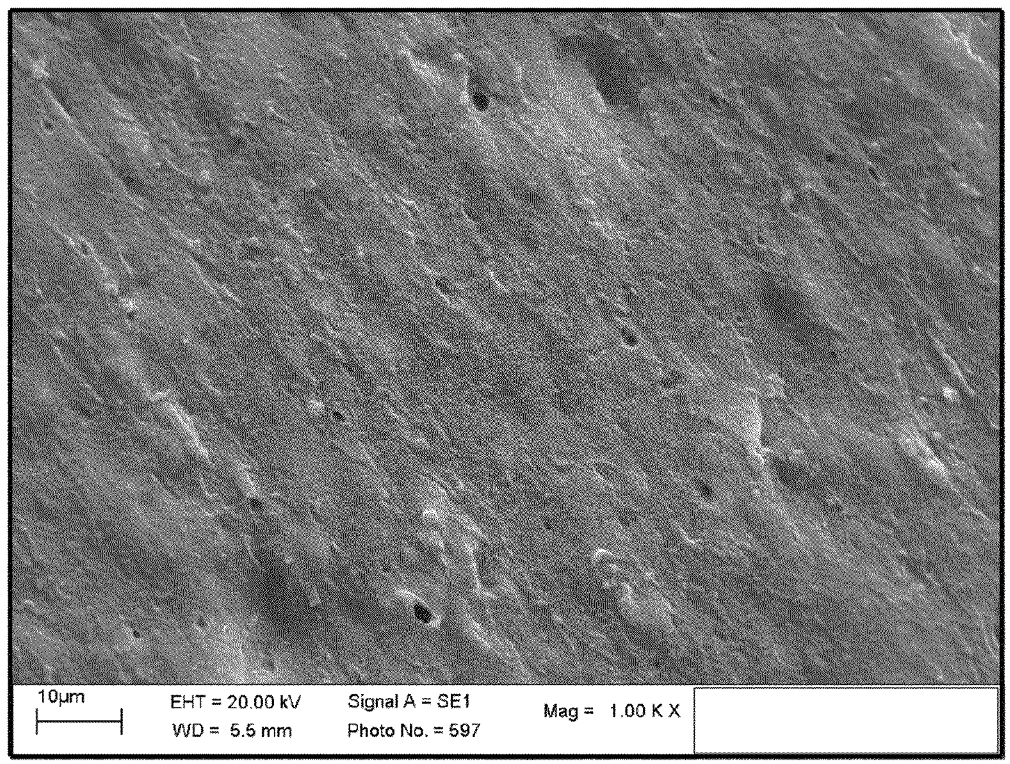
FIG. 5 is a scanning electron micrograph of a toluene-etched surface corresponding to Example 47 (rubber to which was added a poly(phenylene ether) composition containing 63 weight percent poly(phenylene ether), 7 weight percent polystyrene, and 30 weight percent oil).
Figure 6:
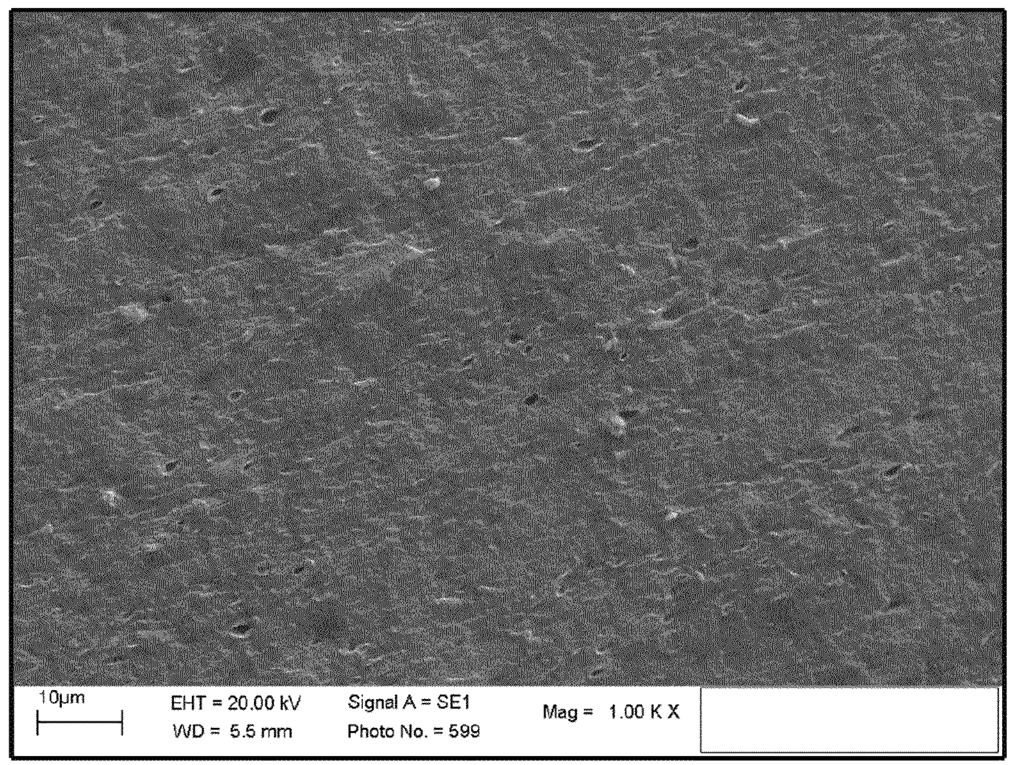
FIG. 6 is a scanning electron micrograph of a toluene-etched surface corresponding to Example 48 (rubber to which was added a poly(phenylene ether) composition containing 56 weight percent poly(phenylene ether), 14 weight percent polystyrene, and 30 weight percent oil).
Figure 7:
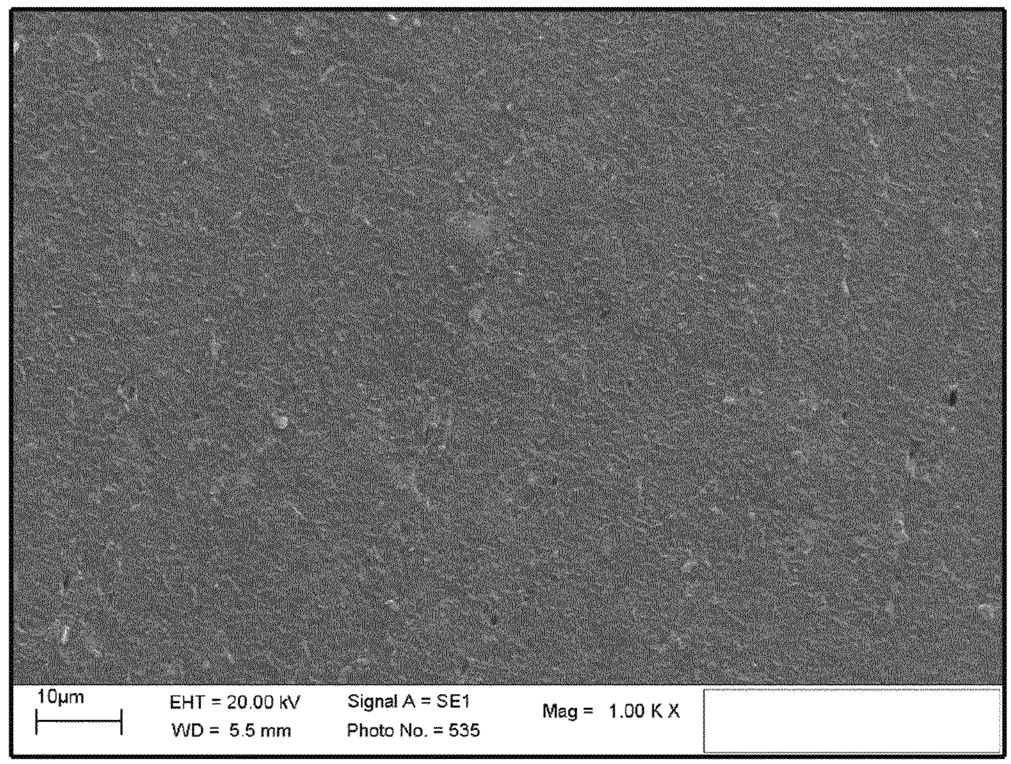
FIG. 7 is a scanning electron micrograph of a toluene-etched surface corresponding to Example 49 (rubber to which was added a poly(phenylene ether) composition containing 49 weight percent poly(phenylene ether), 21 weight percent polystyrene, and 30 weight percent oil).
Figure 8:
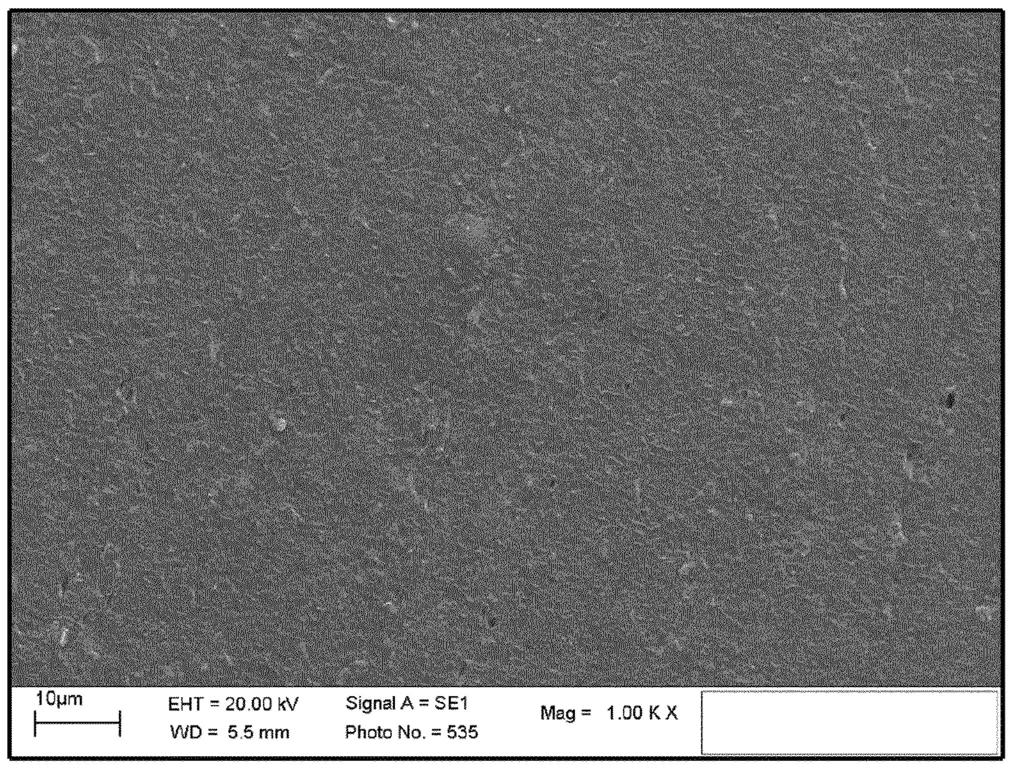
FIG. 8 is a scanning electron micrograph of a toluene-etched surface corresponding to Example 50 (rubber to which was added a poly(phenylene ether) composition containing 56 weight percent poly(phenylene ether), 24 weight percent polystyrene, and 20 weight percent oil).

Dynamic Mechanical Analysis testing yields data for storage modulus and loss modulus as a function of temperature. The ratio of loss modulus to storage modulus is known as tan delta. For a cured rubber sample, a plot of tan delta versus temperature typically exhibits a first local maximum tan delta value at a temperature in the range of about −50 to 0° C. When the rubber includes disperse phase particles of a material having a glass transition temperature, $T_g$, the glass transition temperature can be manifested as a second local maximum tan delta value at a temperature approximately equal to the glass transition temperature of the dispersed phase material. The temperature at which the second local maximum tan delta value occurs is referred to herein as the second hysteresis peak temperature. In FIG. 1, the tan delta curve for the inventive sample exhibits a second hysteresis peak at about 160° C. In contrast, the tan delta curve for the comparison sample does not exhibit a second hysteresis peak. The present method requires that the cured rubber composition exhibits a second hysteresis peak temperature of about 160 to about 220° C. Within this range, the second hysteresis peak temperature can be about 170 to about 215° C., specifically about 180 to about 215° C., more specifically about 190 to about 215° C., even more specifically about 200 to about 215° C. Because the oil-containing poly(phenylene ether) composition has a glass transition temperature of about 40 to about 140° C. before it is incorporated into the uncured rubber, the existence of a second hysteresis peak temperate of at least about 160° C. in the cured rubber demonstrates that the oil that was initially incorporated into the poly(phenylene ether) composition is efficiently dispersed into the rubber composition, thereby restoring the ex-oil glass transition temperature of the poly(phenylene ether) composition. Within the range of about 40 to about 140° C., the glass transition temperature of the oil-containing poly(phenylene ether) can be about 60 to about 130° C., specifically about 80 to about 120° C.

The poly(phenylene ether) composition includes a poly (phenylene ether). Suitable poly(phenylene ether)s include those comprising repeating structural units having the formula

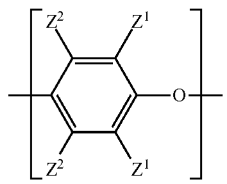

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$, hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of about 0.2 to about 1.5 deciliter per gram measured at 25° C. in chloroform. Within this range, the poly(phenylene ether) intrinsic viscosity can be about 0.25 to about 0.8 deciliter per gram, more specifically about 0.3 to about 0.6 deciliter per gram.

In some embodiments, the poly(phenylene ether) is essentially free of incorporated diphenoquinone residues. In the context, "essentially free" means that the fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly (phenylene ether) comprising terminal or internal diphenoquinone residues. For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Patent Application Publication No. US 2009/0211967 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of about 0.3 to about 0.5 deciliter per gram, specifically about 0.35 to about 0.46 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

Before being blended with oil and any other components used to form the poly(phenylene ether) composition, the poly (phenylene ether) can have a glass transition temperature of about 170 to about 220° C. Within this range, the glass transition temperature of the poly(phenylene ether) can be about 180 to about 215° C., specifically about 190 to about 215° C., more specifically about 200 to about 215° C.

The poly(phenylene ether) composition can comprise the poly(phenylene ether) in an amount of about 40 to about 95 weight percent, based on the weight of the poly(phenylene ether) composition. Within this range, the poly(phenylene ether) amount can be about 50 to about 90 weight percent, specifically about 60 to about 80 weight percent.

The uncured or cured rubber composition can comprise the poly(phenylene ether) in an amount of about 1 to about 30 weight percent, based on the weight of the uncured or cured rubber composition. Within this range, the poly(phenylene ether) amount can be about 2 to about 20 weight percent, specifically about 3 to about 10 weight percent, more specifically about 4 to about 8 weight percent.

In addition to the poly(phenylene ether), the poly(phenylene ether) composition comprises an oil. The type and amount of the oil are such that its presence in the poly(phenylene ether) composition yields a glass transition temperature of about 40 to about 140° C. for the poly(phenylene ether) composition, thereby facilitating dispersion of the poly(phenylene ether) in the uncured rubber composition.

Oils suitable for use in the poly(phenylene ether) composition include, for example, rubber processing oils (including paraffinic mineral oils, mild extraction solvate (MES) oils, distillate aromatic extract (DAE) oils, treated distillate aromatic extract (TDAE) oils, residual aromatic extract (RAE) oils, treated residual aromatic extract (TRAE) oils, special residual aromatic extract (SRAE) oils, naphthenic oils, heavy naphthenic oils, and combinations thereof), extending oils for polyolefins, rubber processing waxes (including polyethylene waxes, montan wax, paraffin wax, beeswax, rice wax, carnauba wax, lanolin wax, and combinations thereof), organophosphate ester flame retardants that are liquids at one atmosphere and at least one temperature in the range of 25 to 120° C. (including resorcinol bis(diphenyl phosphate), resorcinol bis(di-2,6-dimethylphenyl phosphate), bisphenol A bis (diphenyl phosphate), bisphenol A bis(di-2,6-dimethylphenyl phosphate), alkylated triphenyl phosphates, and combinations thereof), and combinations thereof.

In some embodiments, the oil is a rubber processing oil. The advantage of using a rubber processing oil is that such oils are often intentionally added to rubber compositions, and their effects on rubber compositions are desirable and well understood. Rubber processing oils include, for example, paraffinic mineral oils, mild extraction solvate (MES) oils, distillate aromatic extract (DAE) oils, treated distillate aromatic extract (TDAE) oils, residual aromatic extract (RAE) oils, treated residual aromatic extract (TRAE) oils, special residual aromatic extract (SRAE) oils, naphthenic oils, heavy naphthenic oils, and combinations thereof.

In some embodiments, the oil is selected from the group consisting of mild extraction solvate (MES) oils, treated distillate aromatic extract (TDAE) oils, and combinations thereof. In some embodiments, the oil comprises a treated distillate aromatic extract (TDAE) oil. Mild extraction solvate (MES) oils typically have a viscosity at 40° C. of about 100 to about 300 centistokes and contain about 10 to about 15 weight percent aromatic content, about 25 to about 35 weight percent naphthenic content, and about 55 to about 65 weight percent paraffinic content. Representative mild extraction solvate (MES) oils include H&R Group VIVATEC 200 having a 40° C. viscosity of about 210 centistokes, about 15 weight percent aromatic content, about 27 weight percent naphthenic content, and about 58 weight percent paraffinic content; and H&R Group TUDALEN™ 4226 having a 40° C. viscosity of about 220 centistokes, about 13 weight percent aromatic content, about 31 weight percent naphthenic content, and about 56 weight percent paraffinic content. Treated distillate aromatic extract (TDAE) oils typically have a viscosity at 40° C. of about 200 to about 1,200 centistokes and contain about 20 to about 25 weight percent aromatic content, about 25 to about 35 weight percent naphthenic content, and about 40 to about 50 weight percent paraffinic content. Representative treated distillate aromatic extract (TDAE) oils include H&R Group VIVATEC™ 400 having a 40° C. viscosity of about 375 centistokes, about 25 weight percent aromatic content, about 30 weight percent naphthenic content, and about 45 weight percent paraffinic content; and VIVATEC™ 500 having a 40° C. viscosity of about 410 centistokes, about 25 weight percent aromatic content, about 30 weight percent naphthenic content, and about 45 weight percent paraffinic content; and H&R Group TUDALEN™ SX 500 having a 40° C. viscosity of about 500 centistokes, about 24 weight percent aromatic content, about 25 weight percent naphthenic content, and about 51 weight percent paraffinic content.

The poly(phenylene ether) composition can comprise the oil in an amount of about 5 to about 60 weight percent, based on the weight of the poly(phenylene ether) composition. Within this range, the oil amount can be about 10 to about 50 weight percent, specifically about 15 to about 40 weight percent, more specifically about 20 to about 35 weight percent.

The oil component of the poly(phenylene ether) composition can contribute an oil amount of about 0.5 to about 10 weight percent to the uncured or cured rubber composition, based on the weight of the uncured or cured rubber composition. Within this range, the oil amount provided by the poly(phenylene ether) composition can be about 1 to about 8 weight percent, specifically about 1.5 to about 7 weight percent, more specifically about 4 to about 6 weight percent.

The uncured and cured rubber compositions can contain substantial quantities of oil, especially rubber processing oil, in addition to the oil provided by the poly(phenylene ether) composition. Thus, the total amount of oil in the uncured and cured rubber compositions can be up to about 50 weight percent, specifically up to about 45 weight percent.

In some embodiments, the poly(phenylene ether) composition further comprises a styrenic polymer. Suitable styrenic polymers include, for example, poly(alkenyl aromatic)s (such as polystyrenes), rubber-modified poly(alkenyl aromatic)s (such as rubber-modified polystyrenes, also known as high-impact polystyrenes), unhydrogenated block copolymers of an alkenyl aromatic monomer and a conjugated diene (such as polystyrene-polybutadiene diblock copolymers, polystyrene-polybutadiene-polystyrene triblock copolymers, polystyrene-polyisoprene diblock copolymers, and polystyrene-polyisoprene-polystyrene triblock copolymers), hydrogenated block copolymers of an alkenyl aromatic monomer and a conjugated diene (such as polystyrene-poly(ethylene-butylene)diblock copolymer, polystyrene-poly(ethylene-butylene)-polystyrene triblock copolymers, polystyrene-poly-ethylene-propylene)diblock copolymers, and polystyrene-poly(ethylene-propylene)-polystyrene triblock copolymers), and combinations thereof. When present, the styrenic polymer can be used in an amount of about 5 to about 50 weight percent, based the weight of the poly(phenylene ether) composition.

The alkenyl aromatic monomer used to prepare the styrenic polymer can have the structure

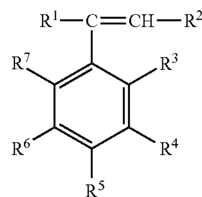

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated or hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

In addition to the required poly(phenylene ether) and oil, and the optional styrenic polymer, the poly(phenylene ether) composition can, optionally, further include one or more additives such as stabilizers, processing aids, UV blockers, dyes, pigments, antioxidants, anti-static agents, metal deactivators, antiblocking agents, and the like, and combinations thereof. When present, such additives are typically used in a total amount of less than or equal to 10 weight percent, specifically less than or equal to 5 weight percent, more specifically less than or equal to 3 weight percent, based on the total weight of the poly(phenylene ether) composition.

Equipment suitable for forming the poly(phenylene ether) composition includes ribbon blenders, Henschel mixers, Banbury mixers, drum tumblers, single-screw extruders, twin-screw extruders, multi-screw extruders, co-kneaders, and the like. In some embodiments, forming the poly(phenylene ether) composition comprises melt blending the oil and the poly(phenylene ether). For example, the poly(phenylene ether) composition can be prepared by melt-blending the poly(phenylene ether), the oil, and any optional components in a twin-screw extruder at a temperature of about 240 to about 300° C., specifically about 250 to about 280° C. Because some of the poly(phenylene ether) compositions described herein can be friable, it may be preferred to avoid the use of the strand pelletizers and underwater pelletizers that are often used at the tail end of poly(phenylene ether) compounding processes. As an alternative, a chilled roll flaker coupled with a size modification mill can be used. As other alternatives, a stainless steel belt cooler and chopper can be used, or a chilled roller can be used to make prills.

The method comprises melt blending the poly(phenylene ether) composition with a rubber comprising ethylenic unsaturation. As used herein, the term "melt blending" requires blending in the absence of solvent and under conditions in which the rubber is melted. Melt blending is therefore distinguished from solution blending methods, including those disclosed in U.S. Pat. No. 4,283,503 to Wright, U.S. Pat. No. 4,388,444 to Irvin, and U.S. Pat. No. 4,436,870 to Hinselmann et al.

The rubber comprising ethylenic unsaturation can be selected from natural rubbers, synthetic rubbers, and combinations thereof. In some embodiments, the rubber comprising ethylenic unsaturation is selected from the group consisting of natural polyisoprenes (natural rubbers), synthetic polyisoprenes, styrene-butadiene random copolymers (SBR), polybutadienes, ethylene-propylene random copolymers (EPM or EPR), ethylene-propylene-diene monomer random copolymers (EPDM), isobutylene-isoprene random copolymers (butyl rubber, IIR), chloroprene rubbers (CR), acrylonitrile-butadiene random copolymers (nitrile rubbers, NBR), and combinations thereof.

In some embodiments, about 5 to about 40 parts by weight of the poly(phenylene ether) composition are melt blended with 100 parts by weight of the rubber comprising ethylenic unsaturation. Within this range, the poly(phenylene ether) composition amount can be about 10 to about 30 parts by weight per 100 parts by weight of the rubber comprising ethylenic unsaturation.

As noted above, melt blending is conducted in the absence of solvent and under conditions in which the rubber is melted. In some embodiments, melt blending is conducted at a temperature of about 100 to about 170° C., specifically about 140 to about 165° C., more specifically about 150 to about 165° C. In some embodiments, melt blending is conducted for a total time of less than or equal to 15 minutes. In some embodiments, melt blending comprises one or two passes of the rubber and the poly(phenylene ether) composition through an extruder. Other equipment suitable for melt blending the rubber and the poly(phenylene ether) composition includes internal mixers (including Banbury mixers and Brabender internal mixers), pin extruders, and the like.

One advantage of the present method is that it facilitates dispersion of the poly(phenylene ether) in the rubber while avoiding the handling of fine particle poly(phenylene ether) powders that pose a dust explosion hazard. Thus, to avoid the handling of fine particle poly(phenylene ether) powders, it is possible to use a poly(phenylene ether) composition that has an average particle size of about 37 micrometers (corresponding to a 400 mesh sieve) to about 2 millimeters (10 mesh sieve) prior to melt blending the rubber and the poly(phenylene ether) composition.

In some embodiments, the disperse phase of the uncured rubber composition or the cured rubber composition has an average particle size less than 35 micrometers, specifically less than or equal to 10 micrometers, more specifically less than or equal to 5 micrometers, still more specifically less than or equal to 1 micrometer. Thus, utilizing the present method, it is possible to add the poly(phenylene ether) composition to the rubber in a form of particles at least about 37 micrometers in size, thereby avoiding a dust explosion hazard, yet form a rubber composition in which the poly(phenylene ether)-containing disperse phase has a particle size on the order of 1 micrometer or smaller.

Because the poly(phenylene ether) composition is molten under rubber blending conditions, the poly(phenylene ether) composition is much more readily dispersed than a corresponding poly(phenylene ether) composition that is solid under the rubber blending conditions. For example, in some embodiments, the poly(phenylene ether) composition before blending with the rubber has a first average particle size, the disperse phase after blending has a second average particle, and the ratio of the first average particle size to the second average particle size is at least 10, specifically at least 30, more specifically at least 100.

In some embodiments, the disperse phase of the uncured rubber composition or the cured rubber composition is substantially compositionally uniform (that is, substantially homogeneous). In some embodiments, the disperse phase of the uncured rubber composition or the cured rubber composition is not crosslinked.

The uncured and cured rubber compositions can, optionally, further comprise one or more additives such as, for example, activators, retarders, resins (including tackifying resins), plasticizers, antioxidants, thermal stabilizers, waxes, antiozonants, deblocking agents, pigments, peptizing agents (such as pentachlorothiophenol and dibenzamidodiphenyl disulfide), and the like, and mixtures thereof.

Similarly, the uncured and cured rubber compositions can, optionally, further include reinforcing and/or non-reinforcing fillers such as carbon black, precipitated silica, fumed silica, kaolin, gypsum, titanium dioxide, bentonite, silicates, and the like, and combinations thereof.

In a very specific embodiment, the method of forming a rubber composition, comprises melt blending 100 parts by weight of a rubber comprising ethylenic unsaturation, and about 5 to about 40 parts by weight of a poly(phenylene ether) composition exhibiting a glass transition temperature of about 40 to about 140° C. and comprising a poly(phenylene ether) having a glass transition temperature of about 170 to about 220° C. and an oil selected from the group consisting of mild extraction solvate (MES) oils, treated distillate aromatic extract (TDAE) oils, residual aromatic extract (RAE) oils, and combinations thereof to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C. Within the range of about 40 to about 140° C., the glass transition temperature can be about 60 to about 130° C., specifically about 80 to about 120° C. Within the range of about 160 to about 220° C., the second hysteresis peak temperature can be about 170 to about 215° C., specifically about 180 to about 215° C., more specifically about 190 to about 215° C., even more specifically about 200 to about 215° C.

One embodiment is a cured rubber composition, comprising: a continuous phase comprising a rubber, and a disperse phase comprising a poly(phenylene ether); wherein the composition is prepared by a method comprising melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form the cured rubber composition; wherein the rubber composition exhibits, by dynamic mechanical analysis, a second hysteresis peak temperature of about 160 to about 220° C.; and wherein the rubber composition exhibits a Graves tear strength value, determined according to ASTM D624-00 (2012) at 23° C., that is at least 10 percent greater than a Graves tear strength value determined for a corresponding composition prepared by a method comprising separately adding the poly(phenylene ether) and the oil to the rubber, rather than melt blending the rubber and the poly(phenylene ether) composition. Within the range of about 40 to about 140° C., the glass transition temperature can be about 60 to about 130° C., specifically about 80 to about 120° C. Within the range of about 160 to about 220° C., the second hysteresis peak temperature can be about 170 to about 215° C., specifically about 180 to about 215° C., more specifically about 190 to about 215° C., even more specifically about 200 to about 215° C. In some embodiments, the Graves tear strength value is about 10 to about 20 percent greater than the Graves tear strength value determined for a corresponding composition prepared by a method comprising separately adding the poly(phenylene ether) and the oil to the rubber. To the extent that the cured rubber sample has a machine roll direction and a cross-roll direction, the improved Graves tear strength can be exhibited in the machine roll direction, the cross-roll direction, or both.

One embodiment is an automotive tire comprising any of the cured rubber compositions described herein. In some embodiments, the cured rubber composition is contained in the tread of the automotive tire.

One embodiment is a poly(phenylene ether) composition comprising: about 50 to about 95 weight percent of a poly (phenylene ether), and about 5 to about 50 weight percent of a rubber processing oil selected from the group consisting of mild extraction solvate (MES) oils, distillate aromatic extract (DAE) oils, treated distillate aromatic extract (TDAE) oils, residual aromatic extract (RAE) oils, treated residual aromatic extract (TRAE) oils, special residual aromatic extract (SRAE) oils, naphthenic oils, heavy naphthenic oils, and combinations thereof.

The invention includes at least the following embodiments.

Embodiment 1

A method of forming a rubber composition, comprising: melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C.

Embodiment 2

The method of embodiment 1, wherein the poly(phenylene ether) has a glass transition temperature of about 170 to about 220° C.

Embodiment 3

The method of embodiment 1 or 2, wherein said melt blending comprises melt blending about 5 to about 40 parts by weight of the poly(phenylene ether) composition and 100 parts by weight of the rubber comprising ethylenic unsaturation.

Embodiment 4

The method of any of embodiments 1-3, wherein said melt blending comprises blending at a temperature of about 100 to about 170° C.

Embodiment 5

The method of any of embodiments 1-4, wherein the rubber comprising ethylenic unsaturation is selected from the group consisting of natural rubbers, synthetic rubbers, and combinations thereof.

Embodiment 6

The method of any of embodiments 1-5, wherein the rubber comprising ethylenic unsaturation is selected from the group consisting of natural polyisoprenes, synthetic polyisoprenes, styrene-butadiene random copolymers, polybutadienes, ethylene-propylene random copolymers, ethylene-propylene-diene monomer random copolymers, isobutylene-isoprene random copolymers, chloroprene rubbers, acrylonitrile-butadiene random copolymers, and combinations thereof.

Embodiment 7

The method of any of embodiments 1-6, wherein the oil is selected from the group consisting of rubber processing oils, extending oils for polyolefins, rubber processing waxes, organophosphate ester flame retardants that are liquids at one atmosphere and at least one temperature in the range of 25 to 120° C., and combinations thereof.

Embodiment 8

The method of any of embodiments 1-7, wherein the oil is a rubber processing oil.

Embodiment 9

The method of any of embodiments 1-8, wherein the oil is selected from the group consisting of mild extraction solvate (MES) oils, treated distillate aromatic extract (TDAE) oils, and combinations thereof.

Embodiment 10

The method of any of embodiments 1-9, wherein the oil comprises a treated distillate aromatic extract (TDAE) oil.

Embodiment 11

The method of any of embodiments 1-10, wherein the poly(phenylene ether) composition has an average particle size of about 37 micrometers to about 2 millimeters prior to said melt blending the rubber comprising ethylenic unsaturation and the poly(phenylene ether) composition.

Embodiment 12

The method of any of embodiments 1-11, wherein the poly(phenylene ether) composition has a first average particle size, the disperse phase has a second average particle, and a ratio of the first average particle size to the second average particle size is at least 10.

Embodiment 13

The method of any of embodiments 1-12, wherein the poly(phenylene ether) composition further comprises about 5 to about 50 weight percent, based the weight of the poly(phenylene ether) composition, of a styrenic polymer selected from the group consisting of poly(alkenyl aromatic)s, rubber-modified poly(alkenyl aromatic)s, unhydrogenated block copolymers of an alkenyl aromatic monomer and a conjugated diene, hydrogenated block copolymers of an alkenyl aromatic monomer and a conjugated diene, and combinations thereof.

Embodiment 14

The method of embodiment 1, wherein said melt blending comprises melt blending 100 parts by weight of the rubber comprising ethylenic unsaturation and about 5 to about 40 parts by weight of the poly(phenylene ether) composition; wherein the poly(phenylene ether) composition comprises a poly(phenylene ether) having a glass transition temperature of about 170 to about 220° C.; and wherein the oil is selected from the group consisting of mild extraction solvate (MES) oils, treated distillate aromatic extract (TDAE) oils, residual aromatic extract (RAE) oils, and combinations thereof.

Embodiment 14a

A method of forming a rubber composition, comprising: melt blending 100 parts by weight of a rubber comprising ethylenic unsaturation, and about 5 to about 40 parts by weight of a poly(phenylene ether) composition exhibiting a glass transition temperature of about 40 to about 140° C. and comprising a poly(phenylene ether) having a glass transition temperature of about 170 to about 220° C. and an oil selected from the group consisting of mild extraction solvate (MES) oils, treated distillate aromatic extract (TDAE) oils, residual aromatic extract (RAE) oils, and combinations thereof to form an uncured rubber composition comprising a continuous phase comprising the rubber containing ethylenic unsaturation and the oil, and a disperse phase comprising the poly(phenylene ether); and curing the uncured rubber composition to form a cured rubber composition exhibiting, by dynamic mechanical analysis, a second hysteresis peak temperature of about 160 to about 220° C.

Embodiment 15

A cured rubber composition formed by the method of any of embodiments 1-14.

Embodiment 16

A cured rubber composition, comprising: a continuous phase comprising a rubber, and a disperse phase comprising a poly(phenylene ether); wherein the composition is prepared by a method comprising melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form the cured rubber composition; wherein the rubber composition exhibits, by dynamic mechanical analysis, a second hysteresis peak temperature of about 160 to about 220° C.; and wherein the rubber composition exhibits a Graves tear strength value, determined according to ASTM D624-00 (2012) at 23° C., that is at least 10 percent greater than a Graves tear strength value determined for a corresponding composition prepared by a method comprising separately adding the poly(phenylene ether) and the oil to the rubber, rather than melt blending the rubber and the poly(phenylene ether) composition.

Embodiment 17

A tire comprising the cured rubber composition of embodiment 16.

Embodiment 18

The tire of embodiment 17, comprising the cured rubber composition in a tread.

Embodiment 19

A poly(phenylene ether) composition comprising: about 50 to about 95 weight percent of a poly(phenylene ether), and about 5 to about 50 weight percent of a rubber processing oil selected from the group consisting of mild extraction solvate (MES) oils, distillate aromatic extract (DAE) oils, treated distillate aromatic extract (TDAE) oils, residual aromatic extract (RAE) oils, treated residual aromatic extract (TRAE) oils, special residual aromatic extract (SRAE) oils, naphthenic oils, heavy naphthenic oils, and combinations thereof.

The invention is further illustrated by the following non-limiting examples.

Examples 1-27, Comparative Examples 1-35

These examples illustrate the preparation of poly(phenylene ether) compositions with oils capable of depressing the glass transition temperature of the resulting blend relative to the glass transition temperature of the poly(phenylene ether) alone.

Components used to prepare poly(phenylene ether) compositions are summarized in Table 1.

TABLE 1

| Component | Description |
|---|---|
| PPE 0.30 | Poly(2,6-dimethyl-1,4-phenylene ether), CAS Reg. No. 24938-67-8, having an intrinsic viscosity of about 0.30 deciliter per gram as measured in chloroform at 25° C.; obtained as PPO ™ 630 Resin from SABIC Innovative Plastics. |
| PS | Atactic polystyrene, CAS Reg. No. 9003-53-6, having a melt flow index of about 1.7 grams per 10 minutes measured according to ASTM D1238, Condition G; obtained as EB3300 High Heat Crystal Polystyrene from Chevron Phillips. |
| TDAE | Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content; obtained as VIVATEC ™ 500 from Hansen & Rosenthal KG. |
| MES | Mild Extraction Solvate (MES) oil having a density at 15° C. of 914.9 kilograms per meter$^3$, a 40° C. viscosity of about 210 centistokes, about 15 weight percent aromatic content, about 27 weight percent naphthenic content, and about 58 weight percent paraffinic content; obtained as VIVATEC ™ 200 from Hansen & Rosenthal KG. |
| RAE | Residual Aromatic Extract (RAE) oil having an average molecular weight of about 581 grams/mole, a viscosity of about 434.4 millimeter$^2$/second at 60° C. measured according to ASTM D445, an aromatic carbon content of about 27 weight percent, a naphthenic carbon content of about 22 weight percent, and a paraffinic content of about 51 weight percent; obtained as SUNDEX ™ 8000 eu from HollyFrontier Lubricants & Specialty Products. |
| RDP | Resorcinol bis(diphenyl phosphate), CAS Reg. No. 57583-54-7; obtained as CR-733S from Daihachi Chemical, as FYROLFLEX ™ RDP from Supresta LLC, or as REOFOS ™ RDP from Great Lakes Chemical Co. Ltd. |
| BPADP | Bisphenol A bis(diphenyl phosphate), CAS Reg. No. 181028-79-5; obtained as CR-741 from Daihachi Chemical, as FYROLFLEX ™ BDP from Supresta LLC, or as REOFOS ™ BAPP from Great Lakes Chemical Co. Ltd. |

Compositions are summarized in Table 2. All poly(phenylene ether) compositions containing process oils were compounded on a twin-screw extruder. Barrel temperatures varied from 250 to 280° C. Poly(phenylene ether) and polystyrene (if any) were fed to the feed throat while liquid components were fed in a liquid feeder port at a downstream barrel. Oil amounts up to 20 weight percent of the total composition were fed via the liquid feeder port. When the oil content exceeded 20 weight percent, the remaining oil was pre-blended with poly(phenylene ether) in a Henschel mixer, and the resulting pre-blend was added to the feed throat of the extruder. Throughput rates were approximately 9 to 18 kilograms per hour (20 to 40 pounds per hour). Each extrudate was then ground into powder using a Pallman PPL18 Turbo mill, manufactured by Pallman Pulverizers. The resulting powder was then passed through a sieve. Except as otherwise stated, an ASTM 30 mesh sieve (with nominal 600 micrometer openings) was used.

Except as noted, glass transition temperature values were determined by differential scanning calorimetry according to ASTM D3418-08, using a TA Instruments Q2000 Differential Scanning calorimeter operating at a temperature ramp rate of 5° C. per minute. For Comparative Examples 7-13, which are miscible blends of poly(phenylene ether) and homopolystyrene, glass transition temperature values were calculated using the Fox equation, $$1/T_g = w_{PPE}/T_{g,PPE} + w_{PS}/T_{g,PS}$$

where $T_g$ is the calculated glass transition temperature for the blend, $w_{PPE}$ is the weight fraction of poly(phenylene ether), $w_{PS}$ is the weight fraction of polystyrene, $T_{g,PPE}$ is the glass transition temperature of poly(phenylene ether) (213° C.), and $T_{g,PS}$ is the glass transition temperature of polystyrene (105° C.). For Comparative Example 13 (polystyrene alone), the glass transition temperature of 105° C. was taken from the supplier's technical data sheet and verified by differential scanning calorimetry.

The glass transition temperatures in Table 2 demonstrate that addition of rubber processing oil (e.g., TDAE, MES, RAE) or flame retardant oil (e.g., RDP, BPADP) to a poly(phenylene ether) composition can yield an oil-containing poly(phenylene ether) composition with a glass transition temperature less than or equal to about 140° C. Such oil-containing poly(phenylene ether) compositions will be molten under conventional rubber blending conditions, and they will therefore be more easily and more finely dispersed in the rubber composition than poly(phenylene ether) compositions having glass transition temperatures substantially greater than 140° C. Having a glass transition temperature less than or equal to about 140° C. is important because higher temperatures result in crosslinking of aliphatically unsaturated groups in the rubber and thus are not suitable for forming uncured rubber blends. The results also show that poly(phenylene ether)s and blends of poly(phenylene ether) and atactic polystyrene in at least a 60:40 weight ratio exhibit glass transition temperature values of at least about 160° C. So, when an oil-containing poly(phenylene ether) composition with a glass transition temperature less than or equal to about 140° C. is incorporated into and well dispersed in a rubber composition, and the oil therein spontaneously migrates from the dispersed poly(phenylene ether) phase into the continuous rubber phase, the resulting poly(phenylene ether) dispersed phase will have a glass transition temperature of at least about 160° C. if the poly(phenylene ether) composition contains poly(phenylene ether) and atactic polystyrene in a weight ratio of 60:40 to 100:0.

TABLE 2

| | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| COMPOSITIONS | | | | | | | |
| PPE 0.30 | 100 | 90 | 85 | 80 | 75 | 70 | 60 |
| PS | 0 | 10 | 15 | 20 | 25 | 30 | 40 |
| TDAE | 0 | 0 | 0 | 0 | 0 | 0 | 0 |
| MES | 0 | 0 | 0 | 0 | 0 | 0 | 0 |
| RAE | 0 | 0 | 0 | 0 | 0 | 0 | 0 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 213.0 | 197.4 | 189.1 | 182.0 | 176.9 | 169.2 | 162.7 |

| | C. Ex. 8 | C. Ex. 9 | C. Ex. 10 | C. Ex. 11 | C. Ex. 12 | C. Ex. 13 | C. Ex. 14 |
|---|---|---|---|---|---|---|---|
| COMPOSITIONS | | | | | | | |
| PPE 0.30 | 50 | 40 | 30 | 20 | 10 | 0 | 100 |
| PS | 50 | 60 | 70 | 80 | 90 | 100 | 0 |
| TDAE | 0 | 0 | 0 | 0 | 0 | 0 | 0 |
| MES | 0 | 0 | 0 | 0 | 0 | 0 | 0 |
| RAE | 0 | 0 | 0 | 0 | 0 | 0 | 0 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 151.9 | 141.6 | 131.8 | 122.5 | 113.6 | 105.0 | 213.0 |

| | C. Ex. 15 | Ex. 1 | Ex. 2 | C. Ex. 16 | C. Ex. 17 | Ex. 3 | Ex. 4 |
|---|---|---|---|---|---|---|---|
| COMPOSITIONS | | | | | | | |
| PPE 0.30 | 90 | 80 | 70 | 90 | 81 | 72 | 63 |
| PS | 0 | 0 | 0 | 10 | 9 | 8 | 7 |
| TDAE | 10 | 20 | 30 | 0 | 10 | 20 | 30 |
| MES | 0 | 0 | 0 | 0 | 0 | 0 | 0 |
| RAE | 0 | 0 | 0 | 0 | 0 | 0 | 0 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 164.4 | 127.8 | 98.9 | 197.4 | 152.5 | 117.8 | 100.6 |

| | C. Ex. 18 | C. Ex. 19 | Ex. 5 | Ex. 6 | C. Ex. 20 | Ex. 7 | Ex. 8 |
|---|---|---|---|---|---|---|---|
| COMPOSITIONS | | | | | | | |
| PPE 0.30 | 80 | 72 | 64 | 56 | 70 | 63 | 56 |
| PS | 20 | 18 | 16 | 14 | 30 | 27 | 24 |
| TDAE | 0 | 10 | 20 | 30 | 0 | 10 | 20 |
| MES | 0 | 0 | 0 | 0 | 0 | 0 | 0 |
| RAE | 0 | 0 | 0 | 0 | 0 | 0 | 0 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 182.0 | 143.9 | 111.8 | 98.6 | 169.2 | 137.8 | 101.2 |

TABLE 2-continued

| | Ex. 9 | Ex. 10 | Ex. 11 | C. Ex. 21 | C Ex. 22 | Ex. 12 | Ex. 13 |
|---|---|---|---|---|---|---|---|
| COMPOSITIONS | | | | | | | |
| PPE 0.30 | 49 | 72 | 56 | 100 | 90 | 82.8 | 79.3 |
| PS | 21 | 18 | 14 | 0 | 0 | 0 | 0 |
| TDAE | 30 | 10 | 30 | 0 | 0 | 0 | 0 |
| MES | 0 | 0 | 0 | 0 | 10 | 17.2 | 20.7 |
| RAE | 0 | 0 | 0 | 0 | 0 | 0 | 0 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 92.2 | 151.2 | 84.2 | 212.0 | 162.1 | 138.0 | 129.3 |

| | Ex. 14 | C. Ex. 23 | C. Ex. 24 | C. Ex. 25 | Ex. 15 | Ex. 16 | Ex. 17 |
|---|---|---|---|---|---|---|---|
| COMPOSITIONS | | | | | | | |
| PPE 0.30 | 65.9 | 100 | 90 | 85 | 80 | 75 | 70 |
| PS | 0 | 0 | 0 | 0 | 0 | 0 | 0 |
| TDAE | 0 | 0 | 0 | 0 | 0 | 0 | 0 |
| MES | 34.1 | 0 | 0 | 0 | 0 | 0 | 0 |
| RAE | 0 | 0 | 10 | 15 | 20 | 25 | 30 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 118.6 | 213.0 | 166.7 | 149.7 | 136.2 | 125.0 | 123.0 |

| | C. Ex. 26 | C. Ex. 27 | Ex. 18 | Ex. 19 | C. Ex. 28 | Ex. 20 | Ex. 21 |
|---|---|---|---|---|---|---|---|
| COMPOSITIONS | | | | | | | |
| PPE 0.30 | 85 | 76.5 | 68 | 59.5 | 75 | 67.5 | 60 |
| PS | 15 | 13.5 | 12 | 10.5 | 25 | 22.5 | 20 |
| TDAE | 0 | 0 | 0 | 0 | 0 | 0 | 0 |
| MES | 0 | 0 | 0 | 0 | 0 | 0 | 0 |
| RAE | 0 | 10 | 20 | 30 | 0 | 10 | 20 |
| RDP | 0 | 0 | 0 | 0 | 0 | 0 | 0 |
| BPADP | 0 | 0 | 0 | 0 | 0 | 0 | 0 |
| PROPERTIES | | | | | | | |
| $T_g$ (° C.) | 189.1 | 151.6 | 126.5 | 114.6 | 176.9 | 137.3 | 116.4 |

| | Ex. 22 | Ex. 23 | Ex. 24 | C. Ex. 29 | C. Ex. 30 | C. Ex. 31 | C. Ex. 32 |
|---|---|---|---|---|---|---|---|
| COMPOSITIONS | | | | | | | |
| PPE 0.30 | 52.5 | 63.75 | 56.25 | 100 | 90 | 85 | 80 |
| PS | 17.5 | 11.25 | 18.75 | 0 | 0 | 0 | 0 |
| TDAE | 0 | 0 | 0 | 0 | 0 | 0 | 0 |
| MES | 0 | 0 | 0 | 0 | 0 | 0 | 0 |
| RAE | 30 | 25 | 25 | 0 | 0 | 0 | 0 |
| RDP | 0 | 0 | 0 | 0 | 10 | 15 | 20 |
| BPADP | 0 | 0 | 0 | 0 | 0 | 0 | 0 |
| PROPERTIES | | | | | | | |
| $T_g$ (° C.) | 110.9 | 125.0 | 116.9 | 212 | 178 | 163 | 149 |

| | Ex. 25 | Ex. 26 | C. Ex. 33 | C. Ex. 34 | C. Ex. 35 | Ex. 27 |
|---|---|---|---|---|---|---|
| COMPOSITIONS | | | | | | |
| PPE 0.30 | 75 | 70 | 100 | 80 | 75 | 70 |
| PS | 0 | 0 | 0 | 0 | 0 | 0 |
| TDAE | 0 | 0 | 0 | 0 | 0 | 0 |
| MES | 0 | 0 | 0 | 0 | 0 | 0 |
| RAE | 0 | 0 | 0 | 0 | 0 | 0 |
| RDP | 25 | 30 | 0 | 0 | 0 | 0 |
| BPADP | 0 | 0 | 0 | 20 | 25 | 30 |
| PROPERTIES | | | | | | |
| $T_g$ (° C.) | 136 | 133 | 212 | 155 | 145 | 134 |

Examples 28-30, Comparative Examples 36-38

These examples illustrate the preparation and testing of rubber compositions, some of which contain the poly(phenylene ether) composition.

Components used in the preparation of rubber compositions are summarized in Table 3. Poly(phenylene ether) compositions listed in Table 3 were prepared by compounding in a twin-screw extruder as described above for Examples 1-27 and Comparative Examples 1-35.

TABLE 3

| Component | Description |
|---|---|
| 6PPD | N-(1,3-Dimethylbuty1)-N'-phenyl-p-phenylenediamine, CAS No. 793-24-8, obtained as FLEXZONE ™ 7 P from Chemtura. |
| Carbon black, N110 | Carbon black, CAS Re. No. 1333-86-4, conforming to ASTM N110; obtained as VULCAN ™ 9 N110 from Cabot. |
| CBS | N-cyclohexyl-2-benzothiazolesulfenamide, CAS Reg. No. 95-33-0; obtained as DELAC ™ S from Chemtura, or as SANTOCURE ™ CBS-GRS-2 mm from Flexsys. |
| cis-BR | Polybutadiene, CAS Reg. No. 9003-17-2, having a cis content of about 98%; obtained as BUDENE ™ 1207 from Goodyear, or as BUNA ™ CB23 from Lanxess. |
| Disulfide silane | Bis(triethoxysilylpropyl) disulfide, CAS Reg. No. 56706-10-6, obtained as SILQUEST ™ A-1589 from Crompton OSi Specialties. |
| DPG | 1,3-Diphenylguanidine, CAS No. 102-06-7; obtained as DPG from Chemtura. |
| DTPD | N,N'-Ditolyl-p-phenylene diamine, CAS No. 68953-84-4, obtained as NOVAZONE ™ AS from Chemtura, or as VULCANOX 3100 from Lanxess. |
| NR | Natural rubber; obtained from Astlett Rubber as TSR 20. |

TABLE 3-continued

| Component | Description |
|---|---|
| PPE 0.09 | A copolymer of 2,6-dimethylphenol and a bifunctional phenolic monomer, having an intrinsic viscosity of about 0.09 deciliter per gram as measured in chloroform at 25° C.; obtained as PPO ™ SA90 Resin from Sabic Innovative Plastics. |
| PPE/PS, 30:70 | A 70:30 weight ratio blend of homopolystyrene and poly(2,6-dimethyl-1,4-phenylene ether), the blend having a glass transition temperature of about 128° C.; prepared by melt blending a poly(2,6-dimethyl-1,4-phenylene ether) having an intrinsic viscosity of 0.46 deciliter per gram obtained as PPO ™ 646 Resin from Sabic Innovative Plastics, and an atactic homopolystyrene having a glass transition temperature of about 100° C. obtained as 1600 from Nova Chemicals. |
| PPE/PS/TDAE, 49:21:30 | A 49:21:30 weight ratio blend of PPE 0.30, PS, and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 from SABIC Innovative Plastics, atactic polystyrene, CAS Reg. No. 9003-53-6, having a melt flow index of 1.7 grams per 10 minutes; obtained as EB3300 from Chevron Phillips, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATECT ™ 500 from Hansen & Rosenthal KG. |
| PPE/PS/TDAE, 56:14:30 | A 56:14:30 weight ratio blend of PPE 0.30, PS, and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, atactic polystyrene, CAS Reg. No. 9003-53-6, having a melt flow index of 1.7 grams per 10 minutes; obtained as EB3300 from Chevron Phillips, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG. |
| PPE/PS/TDAE, 56:24:20 | A 56:24:20 weight ratio blend of PPE 0.30, PS, and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, atactic polystyrene, CAS Reg. No. 9003-53-6, having a melt flow index of 1.7 grams per 10 minutes; obtained as EB3300 from Chevron Phillips, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG. |
| PPE/PS/TDAE, 63:7:30 | A 63:7:30 weight ratio blend of PPE 0.30, PS, and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, atactic polystyrene, CAS Reg. No. 9003-53-6, having a melt flow index of 1.7 grams per 10 minutes; obtained as EB3300 from Chevron Phillips, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG. |
| PPE/TDAE, 70:30, 30 mesh | A 70:30 weight ratio blend of PPE 0.30 and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, and Treated Distillate Aromatic Extract (TDAE) oil having a density at 15° C. of 942.4 kilograms per meter3, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG; the resulting blend was ground and sieved through a 30 mesh (595 micrometer opening) screen. |
| PPE/TDAE, 70:30, 30 mesh, RC | A 70:30 weight ratio blend of PPE 0.30 and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG; the resulting blend was recompounded through the same extruder, then ground and sieved through a 30 mesh (595 micrometer opening) screen. |

TABLE 3-continued

| Component | Description |
|---|---|
| PPE/TDAE, 70:30, 80 mesh | A 70:30 weight ratio blend of PPE 0.30 and TDAE; prepared by melt blending poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC 500 from Hansen & Rosenthal KG; the resulting blend was ground and sieved through an 80 mesh (177 micrometer opening) screen. |
| PPE/TDAE, 70:30, Hensch. | A 70:30 weight ratio blend of PPE 0.30 and TDAE; prepared by dry blending in a Henschel mixer poly(2,6-dimethyl-1,4-phenylene ether) having an intrinsic viscosity of about 0.30 deciliter per gram as measured in chloroform at 25° C., obtained as PPO ™ 630 Resin from SABIC Innovative Plastics, and Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content, obtained as VIVATEC ™ 500 from Hansen & Rosenthal KG; the resulting blend was an oil-coated powder. |
| SBR | Styrene-butadiene random copolymer, CAS Reg. No. 9003-55-8, having a styrene content of 25 weight percent, and 50 weight percent of the product of 1,2-addition of polybutadiene; obtained from Lanxess as BUNA VSL 5025-0 HM, or as NS116R from Zeon Chemicals. |
| SBS | Polystyrene-polybutadiene-polystyrene triblock copolymer having a polystyrene content of about 43 weight percent and a melt flow rate of about 23 grams per 10 minutes measured at 200° C. and 5 kilogram load according to ASTM D1238, obtained as VECTOR ™ 4461 from Dexco Polymers. |
| Silica | Precipitated silica, CAS Reg. No. 112926-00-8 or 7631-86-9, having a Brunauer-Emmett-Teller (BET) surface area of about 165 meter$^2$/gram; obtained as ZEOSIL ™ 1165MP from Rhodia. |
| SIS | A blend of polystyrene-polyisoprene-polystyrene triblock copolymer and polystyrene-polyisoprene diblock copolymer, the blend having a polystyrene content of about 22 weight percent and a melt flow rate of about 2 grams per 10 minutes measured at 200° C. and 5 kilogram load according to ASTM D1238, obtained as KRATON ™ D1111 K Polymer from Kraton Performance Polymers. |
| Stearic acid | Stearic acid, CAS Reg. No. 57-11-4, obtained as INDUSTRENE ™ R from Chemtura. |
| Sulfur | Oil-treated sulfur; obtained as 104 RUBBERMAKERS Sulfur from Harwick Standard Distribution Corporation, or as CRYSTEX ™ HD OT 20 from Solutia. |
| TBBS | N-tertiary-Butyl-2-benzothiazole sulfenamide, CAS No. 95-31-8, obtained as DELAC ™ NS from Chemtura. |
| TDAE | Treated Distillate Aromatic Extract (TDAE) oil having a density at 15° C. of 942.4 kilograms per meter$^3$, a 40° C. viscosity of about 410 centistokes, about 25 weight percent aromatic content, about 30 weight percent naphthenic content, and about 45 weight percent paraffinic content; obtained as VIVATEC ™ 500 from Hansen & Rosenthal KG. |
| TMQ | Poly(1,2-dihydro-2,2,4-trimethylquinoline), CAS No. 26780-96-1, having a glass transition temperature of about 78° C.; obtained as NAUGARD ™ Q from Chemtura. |
| Wax | Paraffin wax, CAS Reg. No. 8002-74-2; obtained as SUNPROOF ™ Regular from Chemtura. |
| Zinc oxide | Propionic acid coated zinc oxide, having a mean particle size of about 0.21 micrometer, a surface area of about 5 meter$^2$/gram, and a specific gravity of about 5.6; obtained as KADOX ™ 720 C or KADOX ™ 920 C from Zinc Corporation of America. |

A non-productive mix (uncured rubber composition lacking curatives) was prepared using a 380 milliliter Brabender mixing bowl equipped with a heat jacket and a cooling line. The initial Brabender temperature was set to 100° C. and the mixing rotor set to 80 rotations per minute (rpm). Styrene-butadiene random copolymer (SBR) was loaded into the mixing chamber and the time at which SBR loading was complete was designated time zero. The ram on the mixer was closed and after 1 minute of mixing to soften the rubber the thermoplastic sample and/or carbon black was added to the mixing bowl over approximately 1 to 2 minutes. The ram on the mixer was closed and the mixture mixed at 80 rpm until the temperature reached 160° C., at which time the mixer rpm was adjusted down to maintain a temperature of less than 170° C. for the remainder of the mixing cycle until 12 minutes. At 12 minutes, the additives (zinc oxide, stearic acid, and 6PPD) were added. The mixer ram was again closed and the rubber blend allowed to mix until 15 minutes, at which time the mixer was stopped, and the rubber blend removed from the mixer and taken onto a 2-roll mill set for 30° C. The rubber blend was banded and then cut and folded 6 times and then sheeted and allowed to cool.

A productive mix (with curatives) was prepared by taking previously prepared sheets of non-productive mix and placing them back onto a 2-roll mill set at 30° C. The curatives were wrapped in a small piece of the non-productive mix and folded to seal the curatives (sulfur and CBS) into a convenient package to add to the mill. After addition of the cure package, the rubber was allowed to band, then cut off the roll and folded into one-third the original size and fed back onto the two-roll mill. This cycle was completed twelve times to mix the curatives completely. In all milling the temperature of the rubber was kept below 100° C. After completion of mixing 1/16 sheets were prepared for later curing.

Curing was conducted on an electrically heated 60.96 centimeter (24 inch) Carver Press. All molds were chrome plated stainless steel conforming to the appropriate dimensions and tolerances according to their ASTM specification. For samples consisting of blends of SBR, BR, and NR, a cure temperature of 160° C. was used and the cure time varied depending on part thickness. Cure times for thick samples like those used for ASTM D412, D1054, and D623 testing were 25 minutes, while cure times for thin samples like those used for ASTM D3182 testing were 22 minutes. For samples consisting of blends of primarily NR, a cure temperature of 160° C. was used, and the cure time varied depending on part thickness. Cure times for thick samples like those used for ASTM D412, D1054, and D623 testing were 20 minutes, while cure times for thin samples like those used for ASTM D3182 testing were 17 minutes.

Cure properties were determined according to ASTM D2084-07 using an Ektron EKT-100H Oscillating Disk Rheometer (ODR). An 8-10 gram sample of approximate dimensions 25 millimeters by 25 millimeters by 8 millimeters was cut from the final sheet specimens to be cured. The sample was placed into the pre-heated ODR test fixture and tested for 30 minutes. For blends with SBR, BR, and NR, testing was conducted at a temperature of 160° C. to yield a cure profile which was interpreted according to ASTM D2084-07. For samples consisting primarily of NR, the test conditions were 150° C. for 30 minutes. All reported values are averages of at least three ODR specimens. ODR cure times are reported in units of minutes (min), and ODR torque values are reported in units of deciNewton-meters (dNm).

Shore A hardness was measured according to ASTM D2240-05 (2010) on 6.3 millimeter thick by 44.6 millimeter diameter cured specimens.

Tensile properties were determined either according to ASTM D3182-07 on dumbbell samples cut from cured 15.24 centimeters by 15.24 centimeters by 1.91 centimeters (6 inches by 6 inches by 0.75 inches) sheets. Alternatively, tensile properties were measured on ring samples according to ASTM D412-06ae2 (Test method B for cut rings, DIN 35 504 using the R1 test specimen and procedures). Tensile strength and tensile modulus values are reported in units of megapascals (MPa). Tensile elongation values are reported in units of percent (%).

Graves tear strength properties were determined according to ASTM D624-00 (2012) at 23° C. Samples were punched from 1 millimeter thick sheets and tested in both the machine roll direction and the cross-roll direction (except as specified, reported values are an average of the machine roll direction and the cross-roll direction). Tear strength values are reporting in units of Newtons/millimeter (N/mm).

Resiliancy testing (Rebound) was conducted according to ASTM D1054-02 (2007) using a Digi test resilience-elasticity-tester (model fe01060). Samples were tested at 25° C. and also at 60° C. Samples for 60° C. testing were conditioned for 24 hours at 60° C. in an air oven prior to testing. Density was measured according to ASTM D792-08 on 6.3 millimeter thick by 44.6 millimeter diameter cured specimens. An average of at least five samples was used and the average reported. Rebound values are reported in units of percent (%).

Heat build up testing (HBU) was conducted according to ASTM D623-07 using an Ektron EKT-2002GF Goodrich Flexometer on 17.8 millimeter diameter by 25 millimeter thick cured samples. The chamber temperature was 100° C. and the sample was pre-heated for 6 hours at 100° C. A load of 11 kilograms, a frequency of 30 cycles/second, and a total test time of 25 minutes were used. The temperature delta after reaching steady state is reported. HBU delta temperature values are reported in values of degrees centigrade (° C.). HBU height drop values are reported in units of percent (%).

The dynamic mechanical analysis (DMA) properties storage modulus (E'), loss modulus (E"), and tan delta (E"/E') were determined using 2 millimeter by 8 millimeter by 14 millimeter strips of cured rubber that were cut from cured sheets used for tensile testing. A QA Instruments dynamical mechanical tester model DMA Q800 was used for all testing. Samples were tested in tensile mode. Temperature sweeps were conducted from −80° C. to 200° C., or −80° C. to 250° C. at a ramp rate of 0.5° C./minute. Testing was conducted at 10 Hertz and in constant strain mode. Second hysteresis peak temperature values, expressed in units of degrees centigrade (° C.), were determined by visual inspections of plots of tan delta versus temperature.

Glass transition temperatures for added thermoplastics were determined before the thermoplastics were added to the rubber composition, using differential scanning calorimetry as described above in the context of Examples 1-27 and Comparative Examples 1-35.

The results in Table 4 show that replacing some of the carbon black with a thermoplastic reinforcement resulted in lower tan delta values at 60° C. for Comparative Example 37 and Examples 28-30 relative to Comparative Example 36. The lower tan delta values at 60° C. are predictive of reduced rolling resistance in a tire containing the rubber. Examples 28-30 all exhibit a second hysteresis peak at greater than 160° C. in their DMA curves. For these samples, the glass transition temperature of the poly(phenylene ether) composition starting material is different from the hysteresis peak temperature in the resulting rubber. This is due to the process oils migrating from the poly(phenylene ether) composition to the unsaturated rubber phase while the poly(phenylene ether) composition is being blended with the rubber. Note that all formulations contained the same amount of total oil content in the final cured rubber. While not wishing to be bound by theory, the present inventors believe that the oil has acted as a temporary plasticizer for the poly(phenylene ether) composition to enable compounding at lower temperatures, but the dispersed poly(phenylene ether)-containing phase loses the oil during processing to yield a dispersed poly(phenylene ether)-containing phase within the cured rubber that has a higher glass transition temperature than the poly(phenylene ether) composition that was added to the non-productive mix. The elevated glass transition temperature of the well-dispersed poly(phenylene ether)-containing phase results in enhanced dynamic mechanical properties for the rubber compositions incorporating the oil-containing poly(phenylene ether) compositions. Examples 28-30 incorporating the oil-containing poly(phenylene ether) compositions exhibited reduced tan Delta values at 60° C., which are predictive of a lower rolling resistance. Examples 28-30 also exhibited lower E' at −15° C. values, which are predictive of better snow and ice tire performance, as well as lower tan delta at 120° C. values, which are predictive of lower heat build up tire performance and correspondingly lower tire abrasion. This can also be seen in the actual Goodrich flexometer results where Examples 28-30 exhibited lower heat build up than Comparative Examples 36-38.

TABLE 4

| | C. Ex. 36 | C. Ex. 37 | Ex. 28 | Ex. 29 | C. Ex. 38 | Ex. 30 |
|---|---|---|---|---|---|---|
| COMPOSITIONS | | | | | | |
| SBR | 36.00 | 36.00 | 36.00 | 36.00 | 36.00 | 36.00 |
| cis-BR | 44.00 | 44.00 | 44.00 | 44.00 | 44.00 | 44.00 |
| NR | 20.00 | 20.00 | 20.00 | 20.00 | 20.00 | 20.00 |
| PPE/PS, 30:70 | 0.00 | 10.00 | 0.00 | 0.00 | 0.00 | 0.00 |
| PPE/TDAE, 70:30, 30 mesh | 0.00 | 0.00 | 0.00 | 14.29 | 0.00 | 0.00 |
| PPE/PS/TDAE, 56:14:30 | 0.00 | 0.00 | 28.57 | 0.00 | 0.00 | 14.29 |
| SBS | 0.00 | 2.00 | 4.00 | 2.00 | 0.00 | 2.00 |
| Silica | 95.00 | 76.13 | 57.26 | 76.13 | 95.00 | 76.13 |
| Disulfide silane | 6.65 | 6.65 | 6.65 | 6.65 | 6.65 | 6.65 |
| TDAE | 45.00 | 45.00 | 36.43 | 40.71 | 45.00 | 40.71 |
| Zinc oxide | 2.50 | 2.50 | 2.50 | 2.50 | 2.50 | 2.50 |
| Stearic acid | 2.50 | 2.50 | 2.50 | 2.50 | 2.50 | 2.50 |
| 6PPD | 2.00 | 2.00 | 2.00 | 2.00 | 2.00 | 2.00 |
| TMQ | 2.00 | 2.00 | 2.00 | 2.00 | 2.00 | 2.00 |
| Wax | 2.00 | 2.00 | 2.00 | 2.00 | 2.00 | 2.00 |
| Carbon black | 1.00 | 1.00 | 1.00 | 1.00 | 1.00 | 1.00 |
| Sulfur | 2.00 | 2.00 | 2.00 | 2.00 | 2.00 | 2.00 |
| CBS | 1.60 | 1.60 | 1.60 | 1.60 | 1.60 | 1.60 |
| DPG | 2.00 | 2.00 | 2.00 | 2.00 | 2.00 | 2.00 |
| PROPERTIES | | | | | | |
| ODR cure time, 160° C. (min) | 9.93 | 7.35 | 4.69 | 4.58 | 10.45 | 4.49 |
| ODR min. torque (dNm) | 5.22 | 3.70 | 4.97 | 5.64 | 5.94 | 5.58 |
| ODR max. torque (dNm) | 24.64 | 26.04 | 27.01 | 25.92 | 24.64 | 25.31 |
| ODR delta torque (dNm) | 19.42 | 22.34 | 22.04 | 20.28 | 18.70 | 19.73 |
| Shore A hardness | 48 | 57 | 54 | 50 | 48 | 51 |
| Dumbbell tensile strength (MPa) | 13.4 | 16.0 | 12.0 | 14.0 | 13.4 | 14.6 |
| Dumbbell ultimate tensile elongation (%) | 440 | 469 | 355 | 389 | 457 | 419 |
| Dumbbell tensile modulus, 100% strain (MPa) | 1.35 | 1.93 | 2.18 | 1.88 | 1.41 | 1.72 |
| Dumbbell tensile modulus, 300% strain (MPa) | 7.52 | 9.45 | 10.09 | 10.10 | 7.31 | 9.21 |
| Dumbbell tensile reinforcement index | 5.56 | 4.88 | 4.63 | 5.38 | 5.19 | 5.35 |
| Graves tear strength (N/mm) | 72.5 | 69.3 | 24.7 | 25.8 | 74.0 | 26.8 |
| Rebound, 23° C. (%) | 49.5 | 47.6 | 65.4 | 58.9 | 49.4 | 60.2 |
| Rebound, 70° C. (%) | 57.1 | 63.2 | 73.7 | 69.5 | 57.6 | 68.7 |
| Rebound, delta (%) | 7.6 | 15.6 | 8.3 | 10.7 | 8.2 | 8.5 |
| HBU, delta temp. (° C.) | 13.1 | 12.5 | 8.6 | 8.2 | 12.4 | 8.3 |
| HBU, height drop (%) | 22.8 | 13.6 | 9.7 | 9.5 | 20.0 | 18.5 |
| Change in E' at −15° C. (%) | 0 | — | −65 | −41 | 2 | −58 |
| DMA at 10 Hz, E' at −15° C. | 38.31 | 72.69 | 13.28 | 22.41 | 39.28 | 16.02 |
| DMA at 10 Hz, Tan Delta at 0° C. | 0.2446 | 0.2532 | 0.1833 | 0.2433 | 0.2536 | 0.2332 |
| DMA at 10 Hz, Tan Delta at 60° C. | 0.1424 | 0.1143 | 0.05483 | 0.08521 | 0.1518 | 0.07824 |
| DMA at 10 Hz, Tan Delta at 120° C. | 0.09057 | 0.09657 | 0.03575 | 0.06900 | 0.09691 | 0.04880 |
| DMA at 10 Hz, $2^{nd}$ Hysteresis peak temp. (° C.) | none | 130 | 164 | >190 | none | 162 |
| $T_g$ of added thermoplastic (° C.) | none | 128 | 85 | 98 | none | 85 |

Examples 31-33, Comparative Examples 39-41

These examples further illustrate the advantages of adding an oil-containing poly(phenylene ether) composition to a rubber composition. Examples 31-33 all utilize a blend of poly(2,6-dimethyl-1,4-phenylene ether) and TDAE (PPE/TDAE blend). For Example 31, the PPE/TDAE blend was compounded once through an extruder, then ground and sieved using a 30 mesh (595 micron opening) sieve. For Example 33, the same procedure was followed except that the PPE/TDAE blend was sieved using an 80 mesh (177 micrometer opening) sieve. For Example 32, the PPE/TDAE blend was compounded twice through the extruder before being ground and sieved using a 30 mesh (595 micron opening) sieve. Examples 31-33 all exhibit increased tear strength, increased rebound, and properties predictive of lower rolling resistance and lower heat build up relative to Comparative Examples 39 and 41 without PPE/TDAE blend. Note that Comparative Example 40, incorporating a poly(phenylene ether)/polystyrene blend without oil, exhibited a 2$^{nd}$ hysteresis peak at around 130° C., which corresponds to the original glass transition temperature of the poly(phenylene ether)/polystyrene blend added to the rubber. In contrast, Examples 31-33 exhibit second hysteresis peaks at or above 185° C., which is much higher than the 85° C. glass transition temperatures exhibited by the PPE/TDAE blends before they were incorporated into the rubber.

TABLE 5

| | C. Ex. 39 | Ex. 31 | Ex. 32 | C. Ex. 40 | Ex. 33 | C. Ex. 41 |
|---|---|---|---|---|---|---|
| COMPOSITIONS | | | | | | |
| SBR | 36.00 | 36.00 | 36.00 | 36.00 | 36.00 | 36.00 |
| cis-BR | 44.00 | 44.00 | 44.00 | 44.00 | 44.00 | 44.00 |
| NR | 20.00 | 20.00 | 20.00 | 20.00 | 20.00 | 20.00 |
| PPE/TDAE, 70:30, 30 mesh | 0.00 | 14.29 | 0.00 | 0.00 | 0.00 | 0.00 |
| PPE/TDAE, 70:30, 80 mesh | 0.00 | 0.00 | 0.00 | 0.00 | 14.29 | 0.00 |
| PPE/TDAE, 70:30, 30 mesh, RC | 0.00 | 0.00 | 14.29 | 0.00 | 0.00 | 0.00 |
| PPE/PS, 30:70 | 0.00 | 0.00 | 0.00 | 10.00 | 0.00 | 0.00 |
| SBS | 0.00 | 2.00 | 2.00 | 2.00 | 2.00 | 0.00 |
| Silica | 95.00 | 76.13 | 76.13 | 76.13 | 76.13 | 95.00 |
| Disulfide silane | 6.65 | 5.33 | 5.33 | 5.33 | 5.33 | 6.65 |
| TDAE | 45.00 | 40.71 | 40.71 | 45.00 | 40.71 | 45.00 |
| Zinc oxide | 2.50 | 2.50 | 2.50 | 2.50 | 2.50 | 2.50 |
| Stearic acid | 2.50 | 2.50 | 2.50 | 2.50 | 2.50 | 2.50 |
| 6PPD | 2.00 | 2.00 | 2.00 | 2.00 | 2.00 | 2.00 |
| TMQ | 2.00 | 2.00 | 2.00 | 2.00 | 2.00 | 2.00 |
| Wax | 2.00 | 2.00 | 2.00 | 2.00 | 2.00 | 2.00 |
| Carbon black | 1.00 | 1.00 | 1.00 | 1.00 | 1.00 | 1.00 |
| Sulfur | 2.00 | 2.00 | 2.00 | 2.00 | 2.00 | 2.00 |
| CBS | 1.60 | 1.60 | 1.60 | 1.60 | 1.60 | 1.60 |
| DPG | 2.00 | 2.00 | 2.00 | 2.00 | 2.00 | 2.00 |
| PROPERTIES | | | | | | |
| ODR cure time, 160° C. (min) | 20 | 20 | 20 | 20 | 20 | 20 |
| ODR t90 (min) | 9.95 | 4.74 | 4.49 | 4.9 | 4.84 | 11.32 |
| ODR min. torque (dNm) | 5.64 | 5.58 | 5.88 | 5.46 | 5.7 | 5.58 |
| ODR max. torque (dNm) | 23.67 | 26.46 | 26.7 | 26.83 | 27.37 | 23.55 |
| ODR delta torque (dNm) | 18.03 | 20.88 | 20.82 | 21.37 | 21.67 | 17.97 |
| Shore A hardness | 46 | 47 | 48 | 44 | 49 | 46 |
| Dumbbell tensile strength (MPa) | 10.55 | 13.46 | 13.71 | 13.19 | 13.59 | 11.10 |
| Dumbbell ultimate tensile elongation (%) | 334 | 398 | 384 | 398 | 384 | 350 |
| Dumbbell tensile modulus, 100% strain (MPa) | 1.59 | 1.87 | 1.77 | 1.75 | 1.75 | 1.54 |
| Dumbbell tensile modulus, 300% strain (MPa) | 9.20 | 9.37 | 10.02 | 8.95 | 9.64 | 8.97 |
| Dumbbell tensile reinforcement index | 5.78 | 5.01 | 5.67 | 5.11 | 5.51 | 5.81 |
| Graves tear strength (N/mm) | 13.8 | 23.6 | 21.3 | 25.0 | 22.0 | 14.1 |
| Rebound, 23° C. (%.) | 47.1 | 51.7 | 53.6 | 55.9 | 54.5 | 48.6 |
| Rebound, 70° C. (%) | 57.3 | 64.3 | 64.1 | 64.6 | 63.9 | 58.1 |
| Rebound, delta (%) | 10.2 | 12.5 | 10.5 | 8.6 | 9.4 | 9.5 |
| HBU, delta temp. (°C) | 21.1 | 18.1 | 18.7 | 15.7 | 16.7 | 19.3 |
| HBU, height drop (%) | −14.9 | −12.2 | −9.7 | −8.8 | −13.2 | −11.1 |
| % Change in E' at −15° C. | 0 | −34 | −52 | −54 | −47 | −4 |
| DMA at 10 Hz, E' at −15° C. | 29.557 | 19.572 | 14.134 | 13.485 | 15.745 | 28.36 |
| DMA at 10 Hz, Tan Delta at 0° C. | 0.253 | 0.236 | 0.242 | 0.236 | 0.238 | 0.258 |
| DMA at 10 Hz, Tan Delta at 60° C. | 0.132 | 0.094 | 0.082 | 0.083 | 0.083 | 0.127 |
| DMA at 10 Hz, Tan Delta at 120° C. | 0.088 | 0.071 | 0.057 | 0.067 | 0.059 | 0.083 |
| DMA at 10 Hz, Tan Delta at 140° C. | 0.081 | 0.067 | 0.053 | 0.077 | 0.057 | 0.078 |
| DMA at 10 Hz, 2$^{nd}$ Hysteresis peak temp. (° C.) | none | 185 | 186 | 135 | 186 | none |
| $T_g$ of added thermoplastic (° C.) | none | 98 | 98 | 130 | 98 | none |

Examples 34-35, Comparative Examples 42-45

These examples further illustrate the advantages of adding an oil-containing poly(phenylene ether) composition to a rubber composition. Here, the advantages are demonstrated at two different loadings of an oil-containing poly(phenylene ether) composition. For both comparative and inventive examples in this set, there is a 1:1 replacement on a volumetric basis of thermoplastic reinforcement for silica reinforcement. Comparative Example 42 is the control sample with no thermoplastic. Comparative Example 43 shows the limited and deleterious effect of only polystyrene-polybutadiene-polystyrene triblock copolymer. Comparative Examples 44 and 45 illustrate replacement of 5 and 10 weight percent of silica with a poly(phenylene ether)/polystyrene blend. And Examples 34 and 35 illustrate replacement of 5 and 10 weight percent of silica with an oil-containing poly(phenylene ether) composition. Note that the extra added oil has been adjusted so that the total formulation oil content is constant across the experimental set.

Comparative Example 43, with block copolymer only, exhibits reduced tear strength, increased tan delta values at 60, 120, and 130° C., and increased heat build up relative to Comparative Example 42 with no block copolymer. In contrast, Examples 34 and 35 with two levels of an oil-containing poly(phenylene ether) composition exhibit desirable reductions in tan delta values at 60, 120, and 130° C., and reduced heat build up relative to Comparative Example 42. Relative to inventive Examples 34 and 35, Comparative Examples 44 and 45, incorporating a poly(phenylene ether)/polystyrene blend, exhibit an elevated tan delta value at 120 and 130° C., which is predictive of undesirably increased heat build up and increased abrasion in an automotive tire containing the rubber.

TABLE 6

| | C. Ex. 42 | C. Ex. 43 | C. Ex. 44 | Ex. 34 | C. Ex. 45 | Ex. 35 |
|---|---|---|---|---|---|---|
| COMPOSITIONS | | | | | | |
| SBR | 36.00 | 36.00 | 36.00 | 36.00 | 36.00 | 36.00 |
| cis-BR | 44.00 | 44.00 | 44.00 | 44.00 | 44.00 | 44.00 |
| NR | 20.00 | 20.00 | 20.00 | 20.00 | 20.00 | 20.00 |
| PPE/PS, 30:70 | 0.00 | 0.00 | 5.00 | 0.00 | 10.00 | 0.00 |
| PPE/TDAE, 70:30, 30 mesh | 0.00 | 0.00 | 0.00 | 7.14 | 0.00 | 14.29 |
| SBS | 0.00 | 2.00 | 1.00 | 1.00 | 2.00 | 2.00 |
| Silica | 95.00 | 95.00 | 85.00 | 85.00 | 76.13 | 76.13 |
| Disulfide silane | 6.65 | 6.65 | 5.95 | 5.95 | 5.95 | 5.95 |
| TDAE | 45.00 | 45.00 | 45.00 | 42.86 | 45.00 | 40.71 |
| Zinc oxide | 2.50 | 2.50 | 2.50 | 2.50 | 2.50 | 2.50 |
| Stearic acid | 2.50 | 2.50 | 2.50 | 2.50 | 2.50 | 2.50 |
| 6PPD | 2.00 | 2.00 | 2.00 | 2.00 | 2.00 | 2.00 |
| TMQ | 2.00 | 2.00 | 2.00 | 2.00 | 2.00 | 2.00 |
| Wax | 2.00 | 2.00 | 2.00 | 2.00 | 2.00 | 2.00 |
| Carbon black | 1.00 | 1.00 | 1.00 | 1.00 | 1.00 | 1.00 |
| Sulfur | 2.00 | 2.00 | 2.00 | 2.00 | 2.00 | 2.00 |
| CBS | 1.60 | 1.60 | 1.60 | 1.60 | 1.60 | 1.60 |
| DPG | 2.00 | 2.00 | 2.00 | 2.00 | 2.00 | 2.00 |
| PROPERTIES | | | | | | |
| ODR cure time, 160° C. (min) | 14.29 | 15.37 | 6.34 | 6.74 | 6.74 | 5.62 |
| ODR min. torque (dNm) | 5.58 | 5.16 | 4.43 | 4.43 | 4.43 | 4.79 |
| ODR max. torque (dNm) | 24.28 | 23.31 | 23.18 | 23.06 | 23.06 | 26.4 |
| ODR delta torque (dNm) | 18.7 | 18.15 | 19.75 | 18.63 | 18.65 | 21.61 |
| Shore A hardness | 52 | 50 | 47 | 48 | 50 | 51 |
| Dumbbell tensile strength (MPa) | 12.57 | 12.9 | 15 | 15.99 | 17.16 | 16.75 |
| Dumbbell ultimate tensile elongation (%) | 429 | 452 | 486 | 511 | 500 | 494 |
| Dumbbell tensile modulus, 100% strain (MPa) | 1.48 | 1.40 | 1.28 | 1.40 | 1.73 | 1.57 |
| Dumbbell tensile modulus, 300% strain (MPa) | 7.37 | 6.98 | 6.90 | 7.20 | 8.43 | 8.34 |
| Dumbbell tensile reinforcement index | 4.98 | 4.99 | 5.39 | 5.14 | 4.87 | 5.30 |
| Graves tear strength (N/mm) | 16.2 | 14.8 | 19.4 | 32.0 | 35.7 | 32.0 |
| Rebound, 23° C. (%) | 44.6 | 43.7 | 52.0 | 51.5 | 57.5 | 54.7 |
| Rebound, 70° C. (%) | 55.8 | 56.4 | 64.7 | 64.3 | 70.0 | 69.7 |
| Rebound, delta (%) | 11.2 | 12.7 | 12.7 | 12.8 | 12.5 | 15.1 |
| HBU, delta temp. (° C.) | 12.5 | 13.8 | 10.1 | 8.3 | 12.1 | 8.2 |
| HBU, height drop (%) | 13.1 | 17.6 | 10.0 | 8.5 | 15.5 | 12.2 |
| % Change in E' at −15° C. | 0 | 1.2 | −45.5 | 8.3 | −22.5 | 18.3 |
| DMA at 10 Hz, E' at −15° C. | 33.13 | 33.52 | 18.44 | 21.19 | 13.73 | 19.78 |
| DMA at 10 Hz, Tan Delta at 0° C. | 0.255 | 0.253 | 0.255 | 0.243 | 0.222 | 0.240 |

TABLE 6-continued

| | C. Ex. 42 | C. Ex. 43 | C. Ex. 44 | Ex. 34 | C. Ex. 45 | Ex. 35 |
|---|---|---|---|---|---|---|
| DMA at 10 Hz, Tan Delta at 60° C. | 0.144 | 0.151 | 0.105 | 0.099 | 0.067 | 0.074 |
| DMA at 10 Hz, Tan Delta at 120° C. | 0.092 | 0.097 | 0.070 | 0.064 | 0.050 | 0.048 |
| DMA at 10 Hz, Tan Delta at 130° C. | 0.084 | 0.088 | 0.065 | 0.058 | 0.055 | 0.046 |

Examples 36-39, Comparative Examples 46-48

These examples further illustrate the advantages of adding an oil-containing poly(phenylene ether) composition to a rubber composition.

Mixing was conducted on an oil-heated Banbury BR Laboratory internal mixer (1600 milliliter batch size).

Milling was conducted on a Reliable Rubber and Plastic Machinery Company two-roll mill with 15.24 centimeter (6 inch) diameter by 33.02 centimeter (13 inch) length chrome rollers, equipped with a hot oil unit. The milling roll temperature was 90° C. The roll speed was about 3 to 8 centimeters/second.

To prepare a non-productive mix (lacking curatives), the mixer temperature was set to 70° C., the rotor speed to 80 rpm, and the ram pressure to 6 bar. The rotor was started, the ram was opened, all rubber components were added to the mixer, and the ram was closed. The mixture was blended for one minute, then the ram was opened and half of the filler and all of the batch chemicals (stearic acid, zinc oxide, process oil, carbon black) were added, then the ram was closed. Mixing was continued for one minute before the ram was opened, the remainder of filler was added, and the ram was closed. After an additional one minute of mixing, the ram was opened and the ram and chute were brushed down, then the ram was closed. The mixture was blended until the desired temperature was reached (135-140° C. for predominantly NR formulations, and 150-160° C. for SBR or SBR/BR/NR "triblend" formulations). The rotor speed was adjusted up or down as needed to maintain the desired mix temperature until the desired total mix time was reached (seven minutes for NR formulations, eleven minutes for SBR or triblend formulations). The resulting non-productive mix was transferred directly to the two-roll mill.

In the two-roll mill, the gap was set to 3.175 millimeters (0.125 inch). The non-productive mix was banded. After a rolling bank formed, a cut down on the rolling bank from the left side was performed. After a rolling bank formed again, a cut down on the rolling bank from the right side was performed. After eight to ten seconds, the batch was cut off the roll and weighed. Batches with greater than 1% weight loss were discarded. Otherwise, the sheet was returned to the mill, folded in thirds and run through the mill five times total, maintaining the grain in the same direction. The sheet was cut into 3.8 centimeter (1.5 inch) strips, and one strip was reserved for preparation of the cure package (using a 0.76 millimeter or 0.03 inch gap).

To prepare a productive mix (with curatives), the mixer temperature was set to 50° C., the rotor speed to 45-50 rpm, and the ram pressure to 6 bar. The rotor was started, the ram opened, the strips of non-productive mix added, and the cure package strip added. The mixture was blended for about 3.25 minutes and discharged from the mixer.

The productive mix from the mixer was added to the two-mill roll, on which the gap was set to 3.175 millimeters (0.125 inch). After a rolling bank formed, a cut down on the rolling bank from the left side was performed. After a rolling bank formed again, a cut down on the rolling bank from the right side was performed. After eight to ten seconds, the batch was cut off the roll and weighed. Batches with greater than 1% weight loss were discarded. Otherwise, the sheet was returned to the mill, folded in thirds and run through the mill three times with a gap of 4.1 millimeters (0.16 inch). A gap of 4.1 millimeters (0.16 inch) was used to prepare samples for ODR and Ring Disks. A gap of 3.81 millimeters (0.15 inch) was used to prepare samples for heat build up testing. A gap of 1.27 millimeters (0.05 inch) was used to prepare samples for tensile property testing.

Sample curing was performed as described above for Examples 28-30.

In Table 7, "$T_g$ of added thermoplastic ex-oil (° C.)" is the glass transition temperature for a comparative composition that is the same as the oil-containing poly(phenylene ether) composition except that it lacks oil.

Compositions and properties are summarized in Table 7. Note that even though they incorporate an oil-containing poly(phenylene ether) composition, Comparative Examples 47 and 48 are marked as comparative because their second hysteresis peak temperatures are below 160° C. Relative to Comparative Example 46, with no thermoplastic additive, Examples 36 and 37, incorporating an oil-containing poly (phenylene ether) composition, exhibit reduced tan delta values at 60, 120, and 130° C., but not 0° C. Relative to Comparative Example 46, with no thermoplastic additive, Example 38 and 39, incorporating an oil-containing poly (phenylene ether) composition and block copolymer, exhibit improved (higher) rebound values at 23 and 70° C.

TABLE 7

| | C. Ex. 46 | Ex. 36 | Ex. 37 | Ex. 38 | Ex. 39 | C. Ex. 47 | C. Ex. 48 |
|---|---|---|---|---|---|---|---|
| COMPOSITIONS | | | | | | | |
| SBR | 36.00 | 36.00 | 36.00 | 36.00 | 36.00 | 36.00 | 36.00 |
| cis-BR | 44.00 | 44.00 | 44.00 | 44.00 | 44.00 | 44.00 | 44.00 |
| NR | 20.00 | 20.00 | 20.00 | 20.00 | 20.00 | 20.00 | 20.00 |
| PPE/TDAE, 70:30, 30 mesh | 0.00 | 14.30 | 28.60 | 14.30 | 28.60 | 0.00 | 0.00 |
| PPE/PS/TDAE, 56:14:30 | 0.00 | 0.00 | 0.00 | 0.00 | 0.00 | 12.50 | 25.00 |
| SBS | 0.00 | 0.00 | 0.00 | 5.00 | 10.00 | 0.00 | 0.00 |
| Silica | 95.00 | 85.00 | 80.00 | 85.00 | 80.00 | 85.00 | 80.00 |
| Disulfide silane | 6.65 | 5.95 | 5.60 | 5.95 | 5.60 | 5.95 | 5.60 |
| Carbon black | 1.00 | 1.00 | 1.00 | 1.00 | 1.00 | 1.00 | 1.00 |
| TDAE | 45.00 | 40.70 | 36.40 | 40.70 | 36.40 | 42.50 | 40.00 |
| Zinc oxide | 2.50 | 2.50 | 2.50 | 2.50 | 2.50 | 2.50 | 2.50 |
| Stearic acid | 2.50 | 2.50 | 2.50 | 2.50 | 2.50 | 2.50 | 2.50 |
| 6PPD | 2.00 | 2.00 | 2.00 | 2.00 | 2.00 | 2.00 | 2.00 |
| TMQ | 2.00 | 2.00 | 2.00 | 2.00 | 2.00 | 2.00 | 2.00 |
| Wax | 2.00 | 2.00 | 2.00 | 2.00 | 2.00 | 2.00 | 2.00 |
| Sulfur | 2.00 | 2.00 | 2.00 | 2.00 | 2.00 | 2.00 | 2.00 |
| CBS | 1.60 | 1.60 | 1.60 | 1.60 | 1.60 | 1.60 | 1.60 |
| DPG | 2.00 | 2.00 | 2.00 | 2.00 | 2.00 | 2.00 | 2.00 |
| PROPERTIES | | | | | | | |
| Density (g/cm$^3$) | 1.187 | 1.168 | 1.155 | 1.163 | 1.147 | 1.164 | 1.151 |
| Shore A hardness | 63 | 61 | 62 | 63 | 63 | 59 | 59 |
| Ring Tensile strength (MPa) | 13.68 | 13.76 | 12.74 | 13.83 | 12.10 | 14.03 | 12.78 |
| Ring Ultimate tensile elongation (%) | 479 | 438.7 | 380 | 439.5 | 344 | 482 | 437 |
| Graves tear strength, with grain (N/mm) | 82 | 40 | 39 | 40 | 41 | 40 | 39 |
| Graves tear strength, cross grain (N/mm) | 70 | 44 | 45 | 42 | 42 | 50 | 41 |
| Rebound, 23° C. (%) | 32.2 | 36.1 | 36.6 | 34.7 | 37.4 | 35.5 | 38.0 |
| Rebound, 70° C. (%) | 45.1 | 51.1 | 52.2 | 50.2 | 51.9 | 51.4 | 52.3 |
| Rebound, delta (%) | 13.0 | 15.1 | 15.6 | 15.4 | 14.6 | 15.9 | 14.3 |
| DMA at 10 Hz, E' at -15° C. | 65.62 | 60.17 | 63.21 | 81.94 | 63.31 | 54.31 | 50.41 |
| DMA at 10 Hz, Tan Delta at 0° C. | 0.140 | 0.148 | 0.158 | 0.143 | 0.151 | 0.144 | 0.137 |
| DMA at 10 Hz, Tan Delta at 60° C. | 0.105 | 0.100 | 0.094 | 0.106 | 0.100 | 0.097 | 0.088 |
| DMA at 10 Hz, Tan Delta at 120° C. | 0.101 | 0.096 | 0.087 | 0.111 | 0.111 | 0.096 | 0.092 |

TABLE 7-continued

| | C. Ex. 46 | Ex. 36 | Ex. 37 | Ex. 38 | Ex. 39 | C. Ex. 47 | C. Ex. 48 |
|---|---|---|---|---|---|---|---|
| DMA at 10 Hz, Tan Delta at 130° C. | 0.096 | 0.093 | 0.086 | 0.111 | 0.113 | 0.097 | 0.097 |
| DMA at 10 Hz, $2^{nd}$ Hysteresis peak temp. (° C.) | none | 175 | 175 | 173 | 174 | 155 | 155 |
| $T_g$ of added thermoplastic (° C.) | none | 98 | 98 | 98 | 98 | 85 | 85 |
| $T_g$ of added thermoplastic ex-oil (° C.) | none | 213 | 213 | 213 | 213 | 182 | 182 |

Examples 40-45, Comparative Examples 49-51

These examples illustrate the advantages of adding an oil-containing poly(phenylene ether) composition to compositions in which the rubber is natural rubber, rather than a blend of styrene-butadiene random copolymer, polybutadiene, and natural rubber, and carbon black, rather than silica, is the primary filler. The examples also explore the effect of a variable milling step.

Samples were prepared as described for Examples 36-39, except for the addition of a variable number of milling steps (0, 5, or 10) after preparation of the productive mix and before curing.

The results for "$T_g$ of added thermoplastic (° C.)" and "$2^{nd}$ Hysteresis peak temp. (° C.)" in Table 8 for Examples 40-45 show that that the oil used to reduce the glass transition temperature of the added thermoplastic migrates from the thermoplastic to the rubber composition during processing, so that the thermoplastic within the rubber composition exhibits a glass transition temperature greater than 160° C. after processing.

The use of 0, 5, or 10 milling repeats in the variable milling step did not appear to significantly affect the material properties. These results show that the poly(phenylene ether) is well-dispersed in the rubber composition during the preparation of the productive mix. It also indicates that method is robust to variations in milling procedure.

TABLE 8

| | C. Ex. 49 | C. Ex. 50 | C. Ex. 51 | Ex. 40 | Ex. 41 | Ex. 42 | Ex. 43 | Ex. 44 | Ex. 45 |
|---|---|---|---|---|---|---|---|---|---|
| COMPOSITIONS | | | | | | | | | |
| NR | 100.0 | 100.0 | 100.0 | 100.0 | 100.0 | 100.0 | 100.0 | 100.0 | 100.0 |
| Carbon black | 48.5 | 48.5 | 48.5 | 43.8 | 43.8 | 43.8 | 43.8 | 43.8 | 43.8 |
| TDAE | 4.00 | 4.00 | 4.00 | 0.00 | 0.00 | 0.00 | 0.00 | 0.00 | 0.00 |
| SIS | 0.00 | 0.00 | 0.00 | 1.86 | 1.86 | 1.86 | 1.86 | 1.86 | 1.86 |
| PPE/TDAE, 70:30, 30 mesh | 0.00 | 0.00 | 0.00 | 13.33 | 13.33 | 13.33 | 0.00 | 0.00 | 0.00 |
| PPE/PS/TDAE, 56:14:30 | 0.00 | 0.00 | 0.00 | 0.00 | 0.00 | 0.00 | 13.33 | 13.33 | 13.33 |
| Stearic acid | 2.00 | 2.00 | 2.00 | 2.00 | 2.00 | 2.00 | 2.00 | 2.00 | 2.00 |
| Zinc oxide | 3.00 | 3.00 | 3.00 | 3.00 | 3.00 | 3.00 | 3.00 | 3.00 | 3.00 |
| 6PPD | 1.50 | 1.50 | 1.50 | 1.50 | 1.50 | 1.50 | 1.50 | 1.50 | 1.50 |
| DTPD | 1.00 | 1.00 | 1.00 | 1.00 | 1.00 | 1.00 | 1.00 | 1.00 | 1.00 |
| Wax | 2.50 | 2.50 | 2.50 | 2.50 | 2.50 | 2.50 | 2.50 | 2.50 | 2.50 |
| Sulfur | 1.65 | 1.65 | 1.65 | 1.65 | 1.65 | 1.65 | 1.65 | 1.65 | 1.65 |
| TBBS | 1.00 | 1.00 | 1.00 | 1.00 | 1.00 | 1.00 | 1.00 | 1.00 | 1.00 |
| PROCESSING | | | | | | | | | |
| No. of end roll steps | 0 | 5 | 10 | 0 | 5 | 10 | 0 | 5 | 10 |
| PROPERTIES | | | | | | | | | |
| ODR min. torque (dNm) | 8.0 | 7.2 | 7.4 | 8.0 | 7.7 | 7.4 | 7.7 | 7.5 | 7.1 |
| ODR max. torque (dNm) | 38.7 | 37.4 | 37.5 | 39.6 | 39.4 | 39.6 | 38.6 | 38.4 | 38.5 |
| ODR delta torque (dNm) | 30.8 | 30.1 | 30.1 | 31.6 | 31.8 | 32.2 | 30.9 | 30.9 | 31.3 |
| ODR t50 (min) | 5.22 | 5.24 | 5.17 | 5.43 | 5.33 | 5.57 | 5.46 | 5.56 | 5.59 |
| ODR t90 (min) | 6.77 | 6.77 | 6.75 | 7.02 | 6.96 | 7.17 | 7.08 | 7.22 | 7.23 |
| ODR t95 (min) | 7.38 | 7.37 | 7.36 | 7.67 | 7.62 | 7.81 | 7.73 | 7.89 | 7.86 |
| Density (g/cm$^3$) | 1.093 | 1.093 | 1.093 | 1.080 | 1.081 | 1.081 | 1.080 | 1.079 | 1.077 |
| Shore A hardness | 59 | 58 | 58 | 62 | 60 | 63 | 63 | 61 | 60 |
| Ring Tensile strength (MPa) | 21.4 | 20.09 | 20.57 | 17.91 | 17.69 | 16.32 | 19.54 | 19.02 | 18.53 |

TABLE 8-continued

| | C. Ex. 49 | C. Ex. 50 | C. Ex. 51 | Ex. 40 | Ex. 41 | Ex. 42 | Ex. 43 | Ex. 44 | Ex. 45 |
|---|---|---|---|---|---|---|---|---|---|
| Ring Ultimate tensile elongation (%) | 464.7 | 449.9 | 455.1 | 383.8 | 375.4 | 344.5 | 418.0 | 422.7 | 407.8 |
| Graves tear strength, with grain (N/mm) | 116 | 114 | 105 | 51 | 56 | 49 | 51 | 49 | 60 |
| Graves tear strength, cross grain (N/mm) | 112 | 112 | 111 | 89 | 69 | 75 | 93 | 101 | 80 |
| Rebound, 23° C. (%) | 43.6 | 43.9 | 44.1 | 45.8 | 44.1 | 45.2 | 45.3 | 46.3 | 45.5 |
| Rebound, 70° C. (%) | 54.6 | 55.9 | 56.3 | 57.9 | 58.0 | 57.4 | 59.2 | 59.2 | 59.4 |
| Rebound, delta (%) | 11.0 | 12.0 | 12.2 | 12.2 | 13.9 | 12.2 | 13.9 | 12.9 | 13.9 |
| DMA at 10 Hz, $2^{nd}$ Hysteresis peak temp. (° C.) | none | none | none | 209 | 216 | 215 | 189 | 189 | 189 |
| $T_g$ of added thermoplastic (° C.) | none | none | none | 98 | 98 | 98 | 84 | 84 | 84 |
| $T_g$ of added thermoplastic ex-oil (° C.) | none | none | none | 213 | 213 | 213 | 182 | 182 | 182 |

Examples 46-51, Comparative Examples 52-54

These examples further illustrate the advantages of adding an oil-containing poly(phenylene ether) composition to carbon-black-filled natural rubber compositions.

Samples were prepared as described for Examples 36-39.

The results for "$T_g$ of added thermoplastic (° C.)" and "$2^{nd}$ Hysteresis peak temp. (° C.)" in Table 9 for Examples 46-51 show that that the oil used to reduce the glass transition temperature of the added thermoplastic migrates from the thermoplastic to the rubber composition during processing, so that the thermoplastic within the rubber composition exhibits a glass transition temperature greater than 160° C. after processing.

Example 46 and Comparative Examples 53 and 54 all have the same overall composition, but vary in the method by which components were combined. The poly(phenylene ether) and TDAE oil of Example 46 were melt blended with each other before being added to the rubber composition, whereas the poly(phenylene ether) and TDAE oil of Comparative Example 53 were separately added to the rubber composition, and the poly(phenylene ether) and TDAE oil of Comparative Example 54 were "dry blended" in a Henschel mixer and stored in a sealed container for 24 hours before being added to the rubber composition. The results for these three samples show that inventive Example 46 exhibits improved (higher) tear strength and tensile strength than Comparative Examples 53 and 54. These results demonstrate the importance of pre-blending the poly(phenylene ether) and the oil to form a poly(phenylene ether) composition exhibiting a glass transition temperature of about 40 to about 140° C. When oil and poly(phenylene ether) are added separately to the rubber composition (as in Comparative Example 54) or even "dry blended" prior to addition to the rubber composition (as in Comparative Example 53), the glass transition temperature of the poly(phenylene ether) is not sufficiently reduced, and the poly(phenylene ether) therefore remains solid when blended with the rubber. In other words, intimately mixing the oil and the poly(phenylene ether) before they are added to the rubber is important to achieve true melt-blending of the poly(phenylene ether) and the rubber, which in turn provides substantially improved dispersion of the poly(phenylene ether) in the rubber.

The improved dispersion of poly(phenylene ether) is further demonstrated by FIGS. 2-8, in which each scale bar is 10 micrometers. These figures are scanning electron micrographs of the surfaces of samples that have been etched for five minutes in toluene to dissolve poly(phenylene ether) particles. In the resulting etched surfaces, craters correspond to spaces formerly occupied by poly(phenylene ether) particles. The FIG. 2 micrograph corresponds to Comparative Example 52, which is a rubber composition without any added poly(phenylene ether) composition. As expected, there are no visible craters in the surface. The FIG. 3 micrograph corresponds to Comparative Example 53, which is a rubber composition to which poly(phenylene ether) and oil were added separately. That micrograph indicates that poly(phenylene ether) particles substantially larger than 10 micrometers in diameter are present in the Comparative Example 53 composition. The FIGS. 4-8 micrographs correspond to Examples 46-50, each prepared with an oil-containing poly (phenylene ether) composition. The micrographs indicate that poly(phenylene ether) particles less than or equal to 1 micrometer—and in some cases substantially smaller—are present in the Examples 46-50 compositions. Collectively, these micrographs demonstrate that the present method utilizing an oil-containing poly(phenylene ether) composition results in much finer dispersion of poly(phenylene ether) particles in rubber than prior art processes utilizing poly (phenylene ether) alone.

TABLE 9

| | C. Ex. 52 | Ex. 46 | Ex. 47 | Ex. 48 | Ex. 49 | Ex. 50 | Ex. 51 | C. Ex. 53 | C. Ex. 54 |
|---|---|---|---|---|---|---|---|---|---|
| COMPOSITIONS | | | | | | | | | |
| NR | 100.0 | 100.0 | 100.0 | 100.0 | 100.0 | 100.0 | 100.0 | 100.0 | 100.0 |
| Carbon black | 48.5 | 43.8 | 43.8 | 43.8 | 43.8 | 43.8 | 40.5 | 43.8 | 43.8 |
| TDAE | 4.00 | 0.00 | 0.00 | 0.00 | 0.00 | 1.67 | 0.00 | 4.00 | 0.00 |
| SIS | 0.00 | 1.86 | 1.86 | 1.86 | 1.86 | 1.86 | 1.86 | 1.86 | 1.86 |
| PPE/TDAE, 70:30, 30 mesh | 0.00 | 13.33 | 0.00 | 0.00 | 0.00 | 0.00 | 0.00 | 0.00 | 0.00 |
| PPE/PS/TDAE, 63:7:30 | 0.00 | 0.00 | 13.3 | 0.00 | 0.00 | 0.00 | 0.00 | 0.00 | 0.00 |
| PPE/PS/TDAE, 56:14:30 | 0.00 | 0.00 | 0.00 | 13.33 | 0.00 | 0.00 | 0.00 | 0.00 | 0.00 |
| PPE/PS/TDAE, 49:21:30 | 0.00 | 0.00 | 0.00 | 0.00 | 13.3 | 0.00 | 0.00 | 0.00 | 0.00 |
| PPE/PS/TDAE, 56:24:20 | 0.00 | 0.00 | 0.00 | 0.00 | 0.00 | 11.66 | 20.0 | 0.00 | 0.00 |
| PPE 0.30 | 0.00 | 0.00 | 0.00 | 0.00 | 0.00 | 0.00 | 0.00 | 9.33 | 0.00 |
| PPE/TDAE, 70:30, Hensch. | 0.00 | 0.00 | 0.00 | 0.00 | 0.00 | 0.00 | 0.00 | 0.00 | 13.3 |
| Stearic acid | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 |
| 6PPD | 1.5 | 1.5 | 1.5 | 1.5 | 1.5 | 1.5 | 1.5 | 1.5 | 1.5 |
| DTPD | 1.0 | 1.0 | 1.0 | 1.0 | 1.0 | 1.0 | 1.0 | 1.0 | 1.0 |
| Wax | 2.5 | 2.5 | 2.5 | 2.5 | 2.5 | 2.5 | 2.5 | 2.5 | 2.5 |
| Sulfur | 1.65 | 1.65 | 1.65 | 1.65 | 1.65 | 1.65 | 1.65 | 1.65 | 1.65 |
| TBBS | 1.00 | 1.00 | 1.00 | 1.00 | 1.00 | 1.00 | 1.00 | 1.00 | 1.00 |
| PROPERTIES | | | | | | | | | |
| ODR min. torque (dNm) | 7.8 | 8.3 | 8.0 | 8.4 | 8.4 | 7.6 | 7.5 | 7.8 | 7.7 |
| ODR max. torque (dNm) | 37.3 | 39.9 | 39.0 | 39.0 | 37.9 | 36.0 | 35.5 | 37.9 | 38.1 |
| ODR delta torque (dNm) | 29.5 | 31.6 | 31.1 | 30.6 | 29.5 | 28.4 | 28.0 | 30.2 | 30.4 |
| ODR t50 (min) | 4.0 | 4.3 | 4.3 | 4.4 | 4.3 | 4.2 | 4.3 | 4.2 | 4.3 |
| ODR t90 (min) | 5.6 | 5.9 | 5.9 | 6.0 | 5.9 | 5.8 | 5.9 | 5.8 | 5.9 |
| ODR t95 (min) | 6.1 | 6.5 | 6.6 | 6.7 | 6.5 | 6.5 | 6.5 | 6.4 | 6.5 |
| Density (g/cm$^3$) | 1.097 | 1.085 | 1.084 | 1.084 | 1.087 | 1.081 | 1.075 | 1.081 | 1.083 |
| Shore A hardness | 59 | 64 | 62 | 61 | 61 | 59 | 59 | 60 | 60 |
| Ring Tensile strength (MPa) | 22.82 | 19.76 | 20.76 | 21.59 | 22.23 | 22.17 | 21.07 | 16.68 | 15.55 |
| Ring Ultimate tensile elongation (%) | 494 | 408.7 | 430.1 | 442.7 | 465.9 | 488.8 | 476.8 | 414 | 388.8 |
| Graves tear strength, with grain (N/mm) | 103 | 67 | 92 | 84 | 95 | 97 | 70 | 65 | 55 |
| Graves tear strength, cross grain (N/mm) | 104 | 78 | 114 | 103 | 98 | 108 | 106 | 66 | 73 |
| Rebound, 23° C. (%) | 43.5 | 43.6 | 45.2 | 45.3 | 44.2 | 44.7 | 46.5 | 47.1 | 46.8 |
| Rebound, 70° C. (%) | 56.6 | 57.0 | 59.2 | 59.3 | 58.3 | 58.5 | 60.2 | 60.5 | 60.8 |
| Rebound, delta (%) | 13.1 | 13.5 | 14.0 | 14.0 | 14.1 | 13.9 | 13.7 | 13.4 | 14.0 |
| DMA at 10 Hz, 2$^{nd}$ Hysteresis peak temp. (° C.) | none | 208 | 202 | 190 | 178 | 175 | 177 | none | none |
| $T_g$ of added thermoplastic (° C.) | none | 98 | 100 | 84 | 92 | 101 | 101 | 212 | 212 |
| $T_g$ of added thermoplastic ex-oil (° C.) | none | 212 | 197 | 182 | 170 | 170 | 170 | 212 | 212 |

Examples 52-54, Comparative Examples 55-57

These examples further illustrate the advantages of adding an oil-containing poly(phenylene ether) composition to carbon-black-filled natural rubber compositions.

Samples were prepared as described for Examples 36-39.

The results for "$T_g$ of added thermoplastic (° C.)" and "2$^{nd}$ Hysteresis peak temp. (° C.)" in Table 10 for Examples 52-54 show that that the oil used to reduce the glass transition temperature of the added thermoplastic migrates from the thermoplastic to the rubber composition during processing, so that the thermoplastic within the rubber composition exhibits a glass transition temperature greater than 160° C. after processing.

Comparative Examples 56 and 57, each containing a poly(phenylene ether) oligomer with a glass transition temperature of about 135° C., illustrate that the use of a thermoplastic with a low glass transition temperature is not sufficient to provide the advantages of the oil-containing poly(phenylene ether) compositions of the invention. Specifically, the tan delta values at 60° C. and 120° C. are significantly higher for Comparative Examples 56 and 57 with poly(phenylene ether) oligomer than they are for the Comparative Example 55 control with no thermoplastic additive. In contrast, Examples 52-54 incorporating oil-containing poly(phenylene ether) compositions each exhibit lower tan delta values at 60° C. than the Comparative Example 55 control. The tan delta values for Examples 52-54 at 120° C. appear to have been undesirably increased by the relatively high SIS content in those samples.

TABLE 10

| | C. Ex. 55 | Ex. 52 | Ex. 53 | Ex. 54 | C. Ex. 56 | C. Ex. 57 |
|---|---|---|---|---|---|---|
| COMPOSITIONS | | | | | | |
| NR | 100.0 | 100.0 | 100.0 | 100.0 | 100.0 | 100.0 |
| Carbon black | 48.50 | 43.84 | 43.84 | 43.84 | 43.84 | 43.84 |
| TDAE | 4.00 | 0.00 | 0.00 | 11.00 | 11.00 | 11.00 |
| PPE/TDAE, 70:30, 30 mesh | 0.00 | 13.33 | 0.00 | 13.33 | 0.00 | 0.00 |
| PPE/PS/TDAE, 56:14:30 | 0.00 | 0.00 | 13.33 | 0.00 | 0.00 | 0.00 |
| PPE 0.09 | 0.00 | 0.00 | 0.00 | 0.00 | 10.00 | 10.00 |
| SIS | 0.00 | 4.67 | 4.67 | 4.67 | 2.00 | 2.00 |
| Disulfide silane | 0 | 0 | 0 | 0 | 0 | 1 |
| Stearic acid | 2 | 2 | 2 | 2 | 2 | 2 |
| Zinc oxide | 3 | 3 | 3 | 3 | 3 | 3 |
| 6PPD | 1.5 | 1.5 | 1.5 | 1.5 | 1.5 | 1.5 |
| DTPD | 1 | 1 | 1 | 1 | 1 | 1 |
| Wax | 2.5 | 2.5 | 2.5 | 2.5 | 2.5 | 2.5 |
| Sulfur | 1.65 | 1.65 | 1.65 | 1.65 | 1.65 | 1.65 |
| TBBS | 1.00 | 1.00 | 1.00 | 1.00 | 1.00 | 1.00 |
| PROPERTIES | | | | | | |
| ODR min. torque (dNm) | 7.5 | 6.8 | 6.9 | 5.1 | 4.7 | 5.6 |
| ODR max. torque (dNm) | 35.4 | 37.9 | 37.3 | 31.4 | 28.9 | 31.8 |
| ODR delta torque (dNm) | 27.9 | 31.0 | 30.4 | 26.3 | 24.3 | 26.1 |
| ODR t50 (min) | 5.1 | 5.6 | 5.7 | 5.7 | 5.7 | 5.7 |
| ODR t90 (min) | 6.7 | 7.2 | 7.3 | 7.3 | 7.7 | 8.0 |
| ODR t95 (min) | 7.4 | 7.8 | 7.9 | 7.9 | 8.4 | 8.8 |
| Density (g/cm$^3$) | 1.085 | 1.079 | 1.080 | 1.063 | 1.076 | 1.076 |
| Shore A hardness | 58 | 62 | 62 | 56 | 57 | 56 |
| Ring Tensile strength (MPa) | 20.01 | 16.98 | 18.56 | 16.14 | 16.78 | 15.53 |
| Ring Ultimate tensile elongation (%) | 436 | 341.5 | 370 | 405 | 429 | 419 |
| Graves tear strength, with grain (N/mm) | 106 | 55 | 91 | 76 | 92 | 86 |
| Graves tear strength, cross grain (N/mm) | 113 | 78 | 96 | 87 | 97 | 81 |
| Rebound, 23° C. (%) | 43.4 | 45.6 | 45.7 | 44.0 | 42.2 | 42.4 |
| Rebound, 70° C. (%) | 56.0 | 57.3 | 57.2 | 58.2 | 52.5 | 53.9 |
| Rebound, delta (%) | 12.6 | 11.7 | 11.5 | 14.2 | 10.3 | 11.5 |
| DMA at 10 Hz, E' at −15° C. | 50.28 | 61.92 | 50.19 | 44.28 | 62.63 | 56.68 |
| DMA at 10 Hz, Tan Delta at 0° C. | 0.115 | 0.106 | 0.113 | 0.113 | 0.108 | 0.118 |
| DMA at 10 Hz, Tan Delta at 60° C. | 0.084 | 0.078 | 0.081 | 0.076 | 0.092 | 0.104 |
| DMA at 10 Hz, Tan Delta at 120° C. | 0.071 | 0.082 | 0.079 | 0.073 | 0.102 | 0.112 |
| DMA at 10 Hz, 2$^{nd}$ Hysteresis peak temp. (° C.) | None | 210 | 189 | 200 | 160 | 159 |
| $T_g$ of added thermoplastic (° C.) | None | 98 | 85 | 98 | 135 | 135 |

Examples 55-57, Comparative Examples 58-61

These examples further illustrate the advantages of adding an oil-containing poly(phenylene ether) composition to carbon-black-filled rubber compositions in which the rubber type is varied from natural rubber to a blend of natural rubber and polybutadiene to a blend of natural rubber, polybutadiene, and styrene-butadiene copolymer.

Samples were prepared as described for Examples 36-39, except that a cure time of 15 minutes and a cure temperature of 150° C. was used.

The results for "$T_g$ of added thermoplastic (° C.)" and "2$^{nd}$ Hysteresis peak temp. (° C.)" in Table 11 for Examples 55-57 show that that the oil used to reduce the glass transition temperature of the added thermoplastic migrates from the thermoplastic to the rubber composition during processing, so that the thermoplastic within the rubber composition exhibits a glass transition temperature greater than 160° C. after processing. This occurred for all three rubber types tested.

Note also that Examples 55-57 prepared with oil-containing poly(phenylene ether) compositions exhibited reduced tan delta values at 0, 60, 120, and 130° C. relative to corresponding Comparative Examples 58-60 (with the exception of Example 57 at 0° C.).

TABLE 11

| | C. Ex. 58 | Ex. 55 | C. Ex. 59 | Ex. 56 | C. Ex. 60 | Ex. 57 | C. Ex. 61 |
|---|---|---|---|---|---|---|---|
| COMPOSITIONS | | | | | | | |
| NR | 100.00 | 100.00 | 80.00 | 80.00 | 60.00 | 60.00 | 100.00 |
| SBR | 0.00 | 0.00 | 0.00 | 0.00 | 20.00 | 20.00 | 0.00 |
| cis-BR | 0.00 | 0.00 | 20.00 | 20.00 | 20.00 | 20.00 | 0.00 |
| TDAE | 4.00 | 0.00 | 4.00 | 0.00 | 4.00 | 0.00 | 4.00 |
| PPE/TDAE, 70:30, 30 mesh | 0.00 | 14.29 | 0.00 | 14.29 | 0.00 | 14.29 | 0.00 |
| SIS | 0.00 | 2.00 | 0.00 | 2.00 | 0.00 | 2.00 | 0.00 |
| Carbon black | 50.00 | 40.00 | 50.00 | 40.00 | 50.00 | 40.00 | 50.00 |
| Zinc oxide | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 |
| DTPD | 1.00 | 1.00 | 1.00 | 1.00 | 1.00 | 1.00 | 1.00 |
| Wax | 2.50 | 2.50 | 2.50 | 2.50 | 2.50 | 2.50 | 2.50 |
| Sulfur | 1.30 | 1.30 | 1.30 | 1.30 | 1.30 | 1.30 | 1.30 |
| TBBS | 1.30 | 1.30 | 1.30 | 1.30 | 1.30 | 1.30 | 1.30 |
| PROPERTIES | | | | | | | |
| ODR t90, 150° C. (min) | 10.47 | 11.79 | 11.03 | 12.76 | 13.01 | 15.40 | 10.81 |
| ODR min. torque (dNm) | 10.01 | 8.19 | 10.44 | 9.28 | 10.98 | 9.47 | 9.83 |
| ODR max. torque (dNm) | 42.85 | 41.46 | 43.46 | 43.58 | 44 | 43.34 | 42.79 |
| ODR delta torque (dNm) | 32.84 | 33.27 | 33.02 | 34.3 | 33.02 | 33.87 | 32.96 |
| Density (g/cm$^3$) | 1.104 | 1.078 | 1.1036 | 1.0782 | 1.1061 | 1.0812 | 1.1021 |
| Shore A hardness | 64 | 67 | 65 | 68 | 66 | 67 | 66 |
| Ring Tensile strength (MPa) | 24.54 | 19.98 | 22.65 | 18.41 | 22.63 | 16.83 | 24.37 |
| Ring Ultimate tensile elongation (%) | 413.3 | 340 | 392.9 | 339.8 | 407.8 | 327.5 | 404.2 |
| Tensile modulus, 50% strain (MPa) | 1.83 | 2.49 | 1.9 | 2.44 | 1.93 | 2.42 | 1.9 |
| Tensile modulus, 100% strain (MPa) | 4.65 | 6.21 | 4.43 | 5.77 | 4.29 | 5.57 | 4.86 |
| Graves tear strength (N/mm) | 100.8 | 82.5 | 100.9 | 55.6 | 67.5 | 46.3 | 126.2 |
| Rebound, 23° C. (%) | 44.1 | 48.6 | 47.4 | 52.3 | 42.9 | 47.8 | 42.2 |
| Rebound, 70° C. (%) | 60.7 | 62.9 | 59.3 | 65.0 | 55.1 | 60.8 | 57.9 |
| Rebound, delta (%) | 16.6 | 14.3 | 11.9 | 12.8 | 12.3 | 13.1 | 15.8 |
| DMA at 10 Hz, E' at −15° C. | 52.02 | 33.94 | 37.19 | 28.03 | 59.56 | 43.73 | — |
| DMA at 10 Hz, Tan Delta at 0° C. | 0.133 | 0.119 | 0.121 | 0.113 | 0.137 | 0.143 | — |
| DMA at 10 Hz, Tan Delta at 60° C. | 0.078 | 0.066 | 0.078 | 0.059 | 0.096 | 0.086 | — |
| DMA at 10 Hz, Tan Delta at 120° C. | 0.064 | 0.062 | 0.062 | 0.049 | 0.073 | 0.067 | — |
| DMA at 10 Hz, Tan Delta at 130° C. | 0.061 | 0.059 | 0.058 | 0.046 | 0.070 | 0.066 | — |

TABLE 11-continued

| | C. Ex. 58 | Ex. 55 | C. Ex. 59 | Ex. 56 | C. Ex. 60 | Ex. 57 | C. Ex. 61 |
|---|---|---|---|---|---|---|---|
| DMA at 10 Hz, $2^{nd}$ Hysteresis peak temp. (° C.) | none | 213 | none | 216 | none | 216 | none |
| $T_g$ of added thermoplastic (° C.) | none | 98 | none | 98 | none | 98 | none |
| $T_g$ of added thermoplastic ex-oil (° C.) | none | 213 | none | 213 | none | 213 | none |

The invention claimed is:

1. A cured rubber composition, comprising:

a continuous phase comprising a rubber, and a disperse phase comprising a poly(phenylene ether);

wherein the composition is prepared by a method comprising melt blending a rubber comprising ethylenic unsaturation, and a poly(phenylene ether) composition exhibiting a glass transition temperature of about 40 to about 140° C. and comprising a poly(phenylene ether) and an oil to form an uncured rubber composition comprising a continuous phase comprising the rubber containing ethylenic unsaturation and the oil, and a disperse phase comprising the poly(phenylene ether); and curing the uncured rubber composition to form the cured rubber composition;

wherein the rubber composition exhibits, by dynamic mechanical analysis, a second hysteresis peak temperature of about 160 to about 220° C.; and wherein the rubber composition exhibits a Graves tear strength value, determined according to ASTM D624-00 (2012) at 23° C., that is at least 10 percent greater than a Graves tear strength value determined for a corresponding composition prepared by a method comprising separately adding the poly(phenylene ether) and the oil to the rubber, rather than melt blending the rubber and the poly(phenylene ether) composition.

2. The cured rubber composition of claim 1, wherein the poly(phenylene ether) has a glass transition temperature of about 170 to about 220° C.

3. The cured rubber composition of claim 1, wherein the rubber comprising ethylenic unsaturation is selected from the group consisting of natural rubbers, synthetic rubbers, and combinations thereof.

4. The cured rubber composition of claim 1, wherein the rubber comprising ethylenic unsaturation is selected from the group consisting of natural polyisoprenes, synthetic polyisoprenes, styrene-butadiene random copolymers, polybutadienes, ethylene-propylene random copolymers, ethylene-propylene-diene monomer random copolymers, isobutylene-isoprene random copolymers, chloroprene rubbers, acrylonitrile-butadiene random copolymers, and combinations thereof.

5. The cured rubber composition of claim 1, wherein the oil is selected from the group consisting of rubber processing oils, extending oils for polyolefins, rubber processing waxes, organophosphate ester flame retardants that are liquids at one atmosphere and at least one temperature in the range of 25 to 120° C., and combinations thereof.

6. The cured rubber composition of claim 1, wherein the oil is a rubber processing oil.

7. The cured rubber composition of claim 1, wherein the oil is selected from the group consisting of mild extraction solvate (MES) oils, treated distillate aromatic extract (TDAE) oils, and combinations thereof.

8. The cured rubber composition of claim 1, wherein the oil comprises a treated distillate aromatic extract (TDAE) oil.

9. The cured rubber composition of claim 1, wherein the poly(phenylene ether) composition further comprises about 5 to about 50 weight percent, based the weight of the poly(phenylene ether) composition, of a styrenic polymer selected from the group consisting of poly(alkenyl aromatic)s, rubber-modified poly(alkenyl aromatic)s, unhydrogenated block copolymers of an alkenyl aromatic monomer and a conjugated diene, hydrogenated block copolymers of an alkenyl aromatic monomer and a conjugated diene, and combinations thereof.

10. A tire comprising the cured rubber composition of claim 1.

11. The tire of claim 10, comprising the cured rubber composition in a tread.

* * * * *